(12) United States Patent
Chen et al.

(10) Patent No.: US 8,310,197 B2
(45) Date of Patent: Nov. 13, 2012

(54) CONTROL DEVICE FOR ELECTRIC MOTOR DRIVE DEVICE

(75) Inventors: Zhiqian Chen, Anjo (JP); Peng He, Chiryu (JP)

(73) Assignee: Aisin Aw Co., Ltd., Anjo (JP)

( * ) Notice: Subject to any disclaimer, the term of this patent is extended or adjusted under 35 U.S.C. 154(b) by 247 days.

(21) Appl. No.: 12/662,254

(22) Filed: Apr. 7, 2010

(65) Prior Publication Data
US 2010/0301788 A1 Dec. 2, 2010

(30) Foreign Application Priority Data

May 28, 2009 (JP) ................................. 2009-129345

(51) Int. Cl.
*H02P 27/04* (2006.01)
(52) U.S. Cl. .......................... 318/801; 318/504; 363/132
(58) Field of Classification Search .................. 318/479, 318/504, 400.02, 801; 363/59
See application file for complete search history.

(56) References Cited

U.S. PATENT DOCUMENTS

| | | | |
|---|---|---|---|
| 5,677,605 A | 10/1997 | Cambier et al. | |
| 6,236,583 B1 * | 5/2001 | Kikuchi et al. | ............... 363/132 |
| 7,164,253 B2 | 1/2007 | Sato et al. | |
| 2007/0125582 A1 | 6/2007 | Egami et al. | |
| 2008/0265808 A1 | 10/2008 | Sparey et al. | |
| 2009/0121669 A1 | 5/2009 | Hanada | |

FOREIGN PATENT DOCUMENTS

| | | |
|---|---|---|
| JP | A-2003-309997 | 10/2003 |
| JP | A-2006-20399 | 1/2006 |
| JP | A-2006-313023 | 11/2006 |
| JP | A-2007-185084 | 7/2007 |
| JP | A-2007-306658 | 11/2007 |
| WO | WO 03/015254 A1 | 2/2003 |
| WO | WO 96/01521 | 1/2006 |

OTHER PUBLICATIONS

International Search Report mailed Jul. 13, 2010 in International Application No. PCT/JP2010/056687 (with translation).
Jul. 18, 2012 Office Action issued in German Patent Application No. DE 11 2010 000 463.3 (English Translation only).

* cited by examiner

*Primary Examiner* — Mark Budd
(74) *Attorney, Agent, or Firm* — Oliff & Berridge, PLC

(57) ABSTRACT

A control device that includes an AC voltage command determination section that determines an AC voltage command value, which is a command value of the AC voltage supplied from the DC/AC conversion section to the AC electric motor, on the basis of a target torque of the AC electric motor and a rotational speed of the AC electric motor; and a system voltage command determination section that determines a system voltage command value, which is a command value of the system voltage generated by the voltage conversion section, on the basis of the AC voltage command value and the system voltage.

9 Claims, 10 Drawing Sheets

CONTROL DEVICE FOR ELECTRIC MOTOR DRIVE DEVICE

INCORPORATION BY REFERENCE

The disclosure of Japanese Patent Application No. 2009-129345 filed on May 28, 2009 including the specification, drawings and abstract is incorporated herein by reference in its entirety.

BACKGROUND

The present invention relates to a control device for an electric motor drive device including a voltage conversion section that converts a power source voltage from a DC power source to generate a desired system voltage and a DC/AC conversion section that converts the system voltage into an AC voltage to supply the resulting AC voltage to an AC electric motor.

An electric motor drive device that converts a DC voltage from a DC power source into an AC voltage through an inverter to drive an AC electric motor is generally used. As the rotational speed of the electric motor becomes higher, the voltage induced by the electric motor becomes higher. Thus, in order to prevent the induced voltage from exceeding the maximum output voltage of the inverter which hinders the flow of a required current through the electric motor, field weakening control is occasionally performed to weaken the field magnetic flux of the electric motor. When the field weakening control is performed, however, the maximum torque that can be output by the electric motor reduces. In order to address the above issue, International Patent Application Publication No. WO 2003/015254 below describes an electric motor drive device including a voltage boost converter that boosts a power source voltage from a DC power source to expand the maximum torque control region to a higher rotational speed range. International Patent Application Publication No. WO 2003/015254 below also describes the configuration of a control device that calculates an appropriate system voltage command value (inverter input voltage target value) in accordance with the target torque and the rotational speed of the electric motor and controls the voltage boost converter so as to achieve the system voltage command value in order to control the electric motor drive device described above.

SUMMARY

In the control device described above, however, the system voltage command value is determined by indirectly estimating the voltage supplied to the electric motor on the basis of the target torque and the rotational speed of the electric motor, and therefore it is required to set the system voltage command value to a voltage value with a certain allowance in consideration of the deviation between the actual voltage supplied to the electric motor and the estimated value. This increases the input voltage of the inverter in correspondence with the allowance, and hence increases the switching loss of the inverter, which accordingly reduces the efficiency.

In the control device described above, in addition, since the system voltage command value is determined by estimating the voltage supplied to the electric motor on the basis of the target torque and the rotational speed of the electric motor, the system voltage command value does not responsively follow abrupt variations in torque or rotational speed of the electric motor. Thus, in the case where a large output (power) is temporarily required, for example in the case where the load torque and the rotational speed of the electric motor vary abruptly due to abrupt variations in load of the electric motor, the system voltage may not follow the variations to result in the voltage boost converter providing an insufficient voltage boost for the actual voltage supplied to the electric motor. Further, in a configuration in which the system voltage command value is determined in accordance with the operating state of the electric motor, it is also desired to appropriately perform both voltage boost control in which the power source voltage is boosted in accordance with the system voltage command value and field weakening control which is incompatible with the voltage boost control in terms of purpose.

Thus, it is desired to develop a control device for an electric motor drive device that can determine a system voltage command value immediately and appropriately in accordance with an actual voltage to be supplied to an electric motor to enhance the efficiency of the electric motor drive device and allow a system voltage to follow the operating state of the electric motor more responsively.

In order to achieve the foregoing object, a control device for an electric motor drive device according to a first aspect of the present invention, including a voltage conversion section that converts a power source voltage from a DC power source to generate a desired system voltage and a DC/AC conversion section that converts the system voltage into an AC voltage to supply the resulting AC voltage to an AC electric motor, includes: an AC voltage command determination section that determines an AC voltage command value, which is a command value of the AC voltage supplied from the DC/AC conversion section to the AC electric motor, on the basis of a target torque of the AC electric motor and a rotational speed of the AC electric motor; and a system voltage command determination section that determines a system voltage command value, which is a command value of the system voltage generated by the voltage conversion section, on the basis of the AC voltage command value and the system voltage.

According to the characteristic configuration, the system voltage command value is determined on the basis of the AC voltage command value directly representing the AC voltage actually supplied to the AC electric motor and the actual value of the system voltage generated by the voltage conversion section by converting the power source voltage. Therefore, the system voltage command value can be determined immediately and appropriately in accordance with the actual voltage supplied to the electric motor. Consequently, it is not required to consider the deviation between the actual voltage supplied to the electric motor and an estimated value thereof in contrast to a configuration in which the system voltage command value is determined by indirectly estimating the voltage supplied to the electric motor on the basis of the target torque and the rotational speed of the electric motor. Therefore, the system voltage command value can be made closer to a value corresponding to the AC voltage actually supplied to the AC electric motor. Hence, a loss in the DC/AC conversion section can be suppressed to enhance the efficiency of the electric motor drive device. In addition, since the system voltage command value is determined on the basis of the AC voltage command value directly representing the AC voltage actually supplied to the AC electric motor, the system voltage command value is allowed to follow variations in operating state of the AC electric motor more responsively.

The control device for an electric motor drive device may further include a voltage index derivation section that derives a voltage index representing a magnitude of the AC voltage command value with respect to the system voltage, and the system voltage command determination section may determine the system voltage command value on the basis of an integral value obtained by integrating the voltage index and the power source voltage.

According to the configuration, by using the integral value of the voltage index representing the magnitude of the AC voltage command value with respect to the system voltage, the system voltage command value can be determined appropriately in accordance with the relationship between the AC voltage command value which directly represents the AC voltage actually supplied to the AC electric motor and the actual value of the system voltage and variations in such values over time. Thus, a loss in the DC/AC conversion section can be suppressed to enhance the efficiency of the electric motor drive device, and additionally the system voltage command value is allowed to follow variations in operating state of the AC electric motor more responsively.

The voltage index may be derived on the basis of any of: a deviation between a voltage command conversion value, which represents a DC voltage required to output the AC voltage command value, and the system voltage; a deviation between a modulation rate, which represents a ratio of the AC voltage command value to the system voltage, and a predetermined target modulation rate; and a deviation between the AC voltage command value and a maximum value of the AC voltage that can be output in accordance with the system voltage. According each of the configurations, the voltage index representing the magnitude of the AC voltage command value with respect to the system voltage can be derived appropriately.

The control device for an electric motor drive device may further include: a field weakening command value determination section that determines a field weakening current command value, which represents a degree of field weakening during field weakening control in which a field magnetic flux of the AC electric motor is weakened, on the basis of the AC voltage command value and the system voltage; and a process switching section that switches between execution of a system voltage determination process in which the system voltage command determination section determines the system voltage command value and execution of a field weakening command value determination process in which the field weakening command value determination section determines the field weakening current command value, and the process switching section may switch between execution of the system voltage determination process and execution of the field weakening command value determination process on the basis of at least the field weakening command value and the system voltage command value.

According to the configuration, the field weakening control can be performed appropriately on the basis of the AC voltage command value and the system voltage. In addition, in the case where both the field weakening control and voltage variation control in which the system voltage is generated by converting the power source voltage and supplied to the DC/AC conversion section, execution of the system voltage determination process in which the system voltage command value is determined and execution of the field weakening command value determination process in which the field weakening command value is determined can be switched appropriately on the basis of the field weakening command value and the system voltage command value. Thus, execution of the field weakening control and execution of the voltage variation control, which are incompatible with each other in terms of purpose, can be switched appropriately in accordance with the operating state of the electric motor.

The DC/AC conversion section may be configured to perform pulse width modulation control when the field weakening command value is zero, and to perform rectangular-wave control in which a rectangular voltage is output when the field weakening command value is a value other than zero, and the process switching section may execute the field weakening command value determination process when the AC voltage command value exceeds the maximum value of the AC voltage that can be output in accordance with the system voltage at that time until the field weakening command value reaches a predetermined first threshold, suspend the field weakening command value determination process when the field weakening command value reaches the predetermined first threshold to execute the system voltage determination process until the system voltage command value reaches a predetermined second threshold, and resume the field weakening command value determination process when the system voltage command value reaches the predetermined second threshold.

According to the configuration, when the field weakening command value is zero and thus it is not required to perform the field weakening control, the DC/AC conversion section is caused to perform the pulse width modulation control in order to control the AC electric motor appropriately while suppressing torque variations. Meanwhile, when it is required to perform the field weakening control, the DC/AC conversion section is caused to perform the rectangular-wave control in order to reduce the switching loss in the DC/AC conversion section while suppressing the degree of field weakening. As a result, the efficiency of the electric motor drive device can be enhanced. According to the configuration, in addition, in the case where the AC voltage command value exceeds the maximum value of AC voltage that can be output in accordance with the system voltage at that time with the rotational speed and the target torque of the AC electric motor increasing, for example, the field weakening control and the rectangular-wave control are first executed, and thereafter voltage conversion is performed in which the power source voltage is converted (in this case, boosted) to generate the system voltage with the field weakening control and the rectangular-wave control kept being performed. Thus, the effect of the rectangular-wave control to reduce the switching loss can be obtained over a wide operating range to enhance the efficiency of the electric motor drive device. In this event, preferably, the first threshold, which is a threshold of the field weakening command value for starting the voltage conversion, is set such that the improvement in efficiency due to the reduction in switching loss achieved by the rectangular-wave control exceeds the reduction in efficiency due to the increase in degree of field weakening. In the case where the system voltage command value reaches the predetermined second threshold which is set to the upper limit of the converted voltage (the upper limit of the boosted voltage), for example, the field weakening command value determination process is resumed. Therefore, after it becomes impossible to perform further voltage conversion, the rotational speed of the AC electric motor can be increased through normal field weakening control to expand the operable region of the AC electric motor.

DETAILED DESCRIPTION OF EMBODIMENTS

Figure 1:
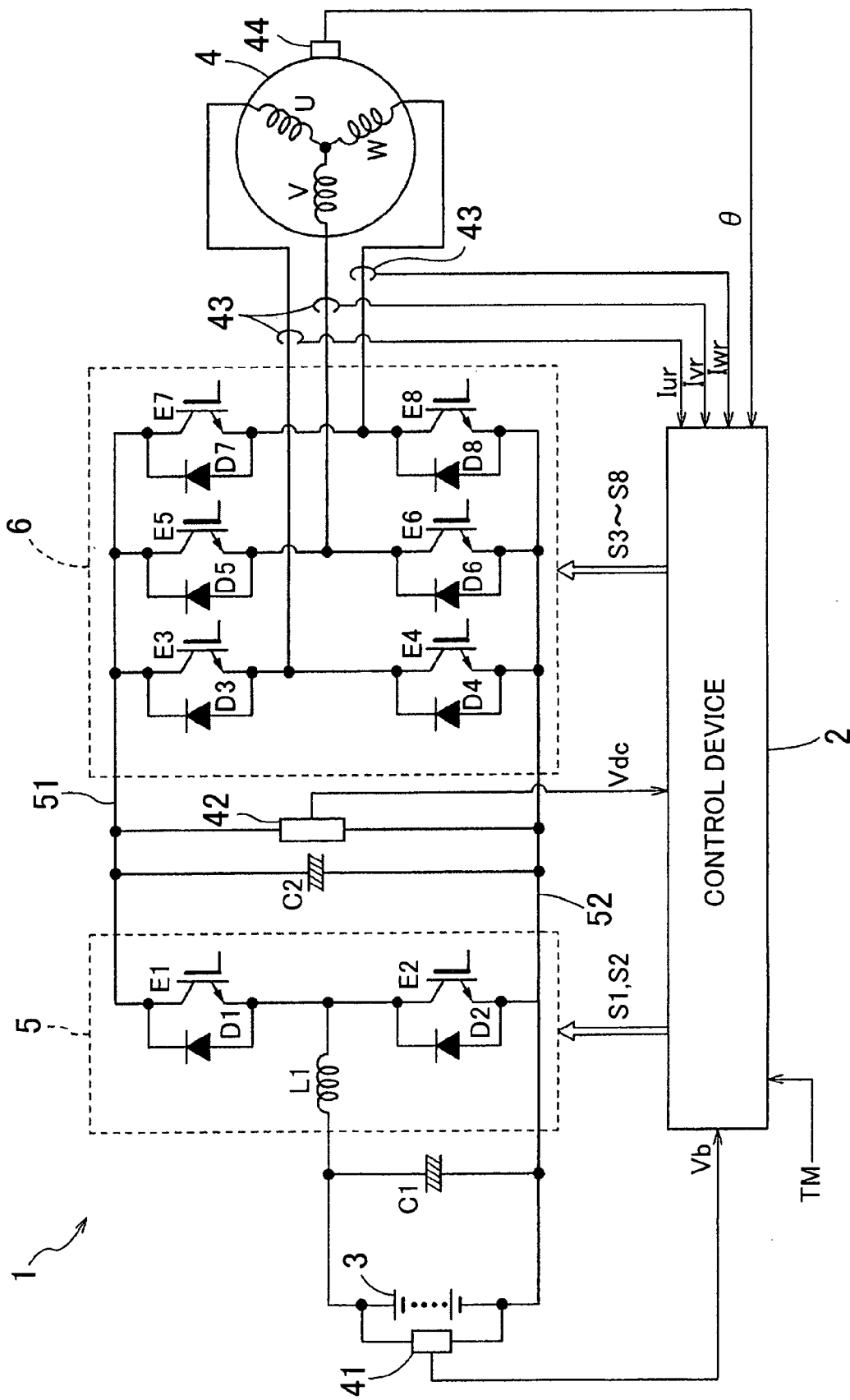
FIG. 1 is a circuit diagram showing the configuration of an electric motor drive device according to a first embodiment of the present invention.
Figure 2:
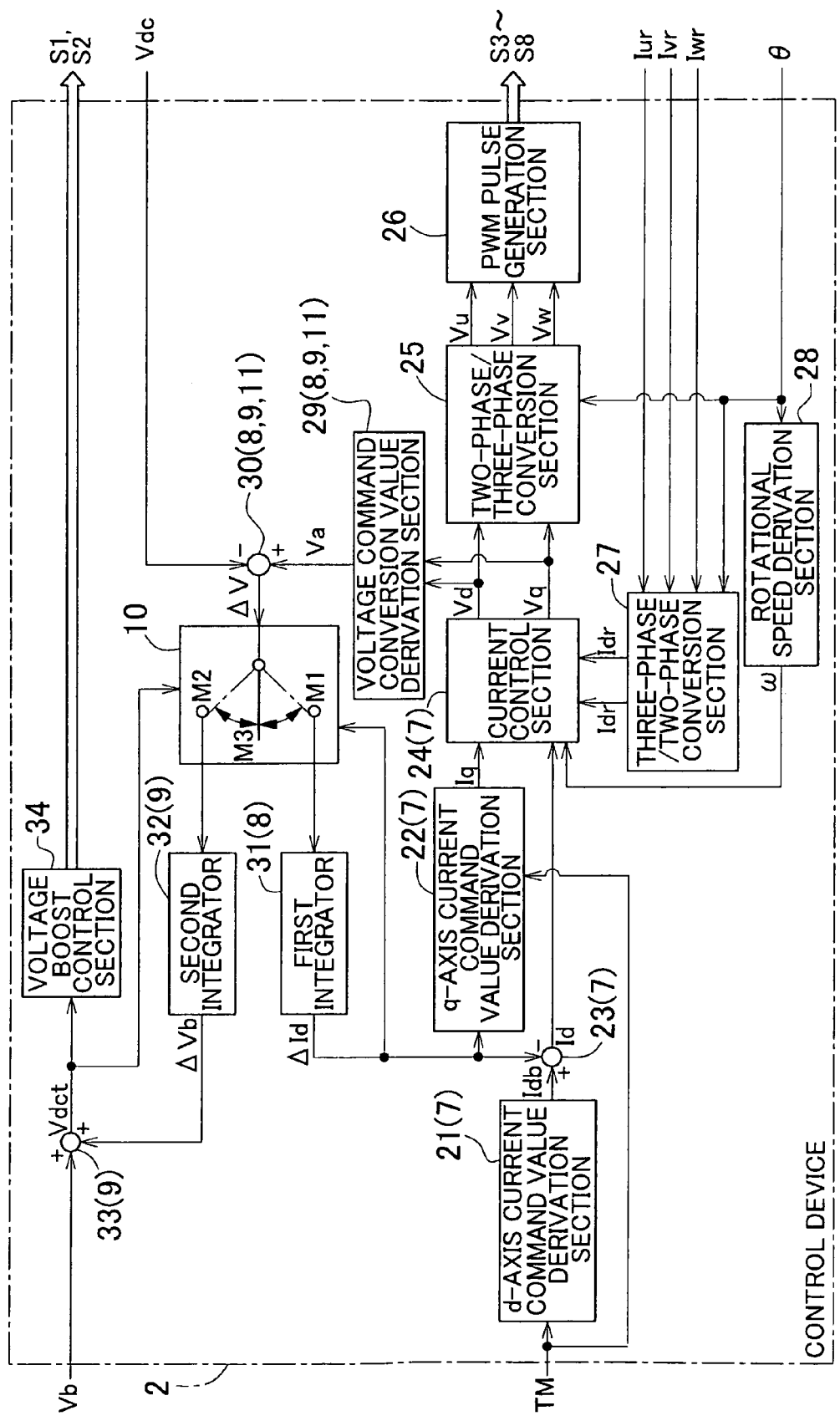
FIG. 2 is a functional block diagram of a control device according to the first embodiment of the present invention.

A first embodiment of the present invention will be described with reference to the drawings. In the embodiment, as shown in FIG. 1, an electric motor drive device 1 is configured to as a device that drives an interior permanent magnet synchronous motor 4 (IPMSM, hereinafter simply referred to as an "electric motor 4") which is an AC electric motor that operates on three-phase AC. The electric motor 4 is configured to operate also as a generator as necessary. The electric motor 4 is used as a drive power source for an electric vehicle, a hybrid vehicle, or the like. The electric motor drive device 1 includes a converter 5 that converts a power source voltage Vb from a DC power source 3 to generate a desired system voltage Vdc, and an inverter 6 that converts the system voltage Vdc into an AC voltage to supply the resulting AC voltage to the electric motor 4. In the embodiment, as shown in FIG. 2, a control device 2 controls the electric motor drive device 1 to perform current feedback control of the electric motor 4 using a vector control method. The control device 2 is characterized by determining a system voltage command value Vdct, which is a command value of the system voltage Vdc generated by the converter 5, on the basis of AC voltage command values Vd and Vq, which are determined on the basis of a target torque TM and a rotational speed ω of the electric motor 4, and the actual system voltage Vdc after being converted by the converter 5. The electric motor drive device 1 and the control device 2 for the electric motor drive device 1 according to the embodiment will be described in detail below.

1-1. Configuration of Electric Motor Drive Device

First, the configuration of the electric motor drive device 1 according to the embodiment will be described with reference to FIG. 1. The electric motor drive device 1 includes a converter 5 and an inverter 6. The electric motor drive device 1 also includes a DC power source 3, a first smoothing capacitor C1 that smoothes the power source voltage Vb from the DC power source 3, and a second smoothing capacitor C2 that smoothes the system voltage Vdc after being boosted by the converter 5. As the DC power source 3, various types of secondary batteries such as nickel-hydrogen secondary batteries and lithium-ion secondary batteries, capacitors, or a combination thereof, for example, may be used. The power source voltage Vb which is the voltage of the DC power source 3 is detected by a power source voltage sensor 41 and output to the control device 2.

The converter 5 is a DC/DC converter that converts the power source voltage Vb from the DC power source 3 to generate the system voltage Vdc which is DC at a desired value, and is equivalent to the voltage conversion section of the present invention. In the embodiment, the converter 5 functions as a voltage boost converter that boosts the power source voltage Vb to generate the desired system voltage Vdc. When the electric motor 4 functions as a generator, the converter 5 reduces the system voltage Vdc from the inverter 6 to supply the reduced voltage to the DC power source 3 in order to charge the DC power source 3. The converter 5 includes a reactor L1, voltage conversion switching elements E1 and E2, and diodes D1 and D2. As the voltage conversion switching elements, the converter 5 includes a pair of an upper arm element E1 and a lower arm element E2 connected in series. In the example, IGBTs (insulated gate bipolar transistors) are used as the voltage conversion switching elements E1 and E2. The emitter of the upper arm element E1 and the collector of the lower arm element E2 are connected to the positive electrode terminal of the DC power source 3 via the reactor L1. The collector of the upper arm element E1 is connected to a system voltage line 51, to which the voltage after being boosted by the converter 5 is supplied. The emitter of the lower arm element E2 is connected to a negative electrode line 52, which is connected to the negative electrode terminal of the DC power source 3. The free-wheel diodes D1 and D2 are respectively connected in parallel with the voltage conversion switching elements E1 and E2. As the voltage conversion switching elements E1 and E2, power transistors of various structures such as a bipolar type, a field-effect type, and a MOS type may be used besides IGBTs.

The voltage conversion switching elements E1 and E2 respectively operate to turn on and off in accordance with switching control signals S1 and S2 output from the control device 2. In the embodiment, each the switching control signals S1 and S2 is a gate drive signal for driving the gate of each of the switching elements E1 and E2. Consequently, the converter 5 boosts the power source voltage Vb supplied from the DC power source 3 to the desired system voltage Vdc to supply the boosted voltage to the system voltage line 51 and the inverter 6 during voltage boost operation. Also, the converter 5 reduces the system voltage Vdc supplied from the inverter 6 to supply the reduced voltage to the DC power source 3 during voltage reduction operation. The system voltage Vdc generated by the converter 5 is detected by a system voltage sensor 42 and output to the control device 2. In the case where a voltage boost command value ΔVb (see FIG. 2) is zero so that the converter 5 performs no voltage boost as discussed later, the system voltage Vdc is equal to the power source voltage Vb.

The inverter 6 is a device that converts the system voltage Vdc which is DC into an AC voltage to supply the resulting AC voltage to the electric motor 4, and is equivalent to the DC/AC conversion section of the present invention. The inverter 6 includes a plurality of sets of switching elements E3 to E8 and diodes D3 to D8. The inverter 6 includes a pair of switching elements for each of the phases (three phases, namely U-phase, V-phase, and W-phase) of the electric motor 4, which are specifically a U-phase upper arm element E3 and a U-phase lower arm element E4, a V-phase upper arm element E5 and a V-phase lower arm element E6, and a W-phase upper arm element E7 and a W-phase lower arm element E8. In the example, IGBTs (insulated gate bipolar transistors) are used as the switching elements E3 to E8. The emitters of the upper arm elements E3, E5, and E7 for each phase and the collectors of the lower arm elements E4, E6, and E8 for each phase are respectively connected to the coils of the electric motor 4 for each phase. The collectors of the upper arm elements E3, E5, and E7 for each phase are connected to the system voltage line 51. The emitters of the lower arm elements E4, E6, and E8 for each phase are connected to the negative electrode line 52. The free-wheel diodes D3 to D8 are respectively connected in series with the switching elements E3 to E8. As the switching elements E3 to E8, power transistors of various structures such as a bipolar type, a field-effect type, and a MOS type may be used besides IGBTs.

The switching elements E3 to E8 respectively operate to turn on and off in accordance with switching control signals S3 to S8 output from the control device 2. Consequently, the inverter 6 converts the system voltage Vdc into an AC voltage to supply the resulting AC voltage to the electric motor 4 in order to cause the electric motor 4 to output a torque matching the target torque TM. In this event, the switching elements E3 to E8 perform switching operation in accordance with the switching control signals S3 to S8 under PWM (pulse width modulation) control or rectangular-wave control to be discussed later. In the embodiment, each of the switching control signals S3 to S8 is a gate drive signal for driving the gate of each of the switching elements E3 to E8. Meanwhile, when the electric motor 4 functions as a generator, the inverter 6 converts the generated AC voltage into a DC voltage to supply the resulting DC voltage to the system voltage line 51 and the converter 5. Phase currents that flow between the inverter 6 and the coils of the electric motor 4 for each phase, specifically a U-phase current Iur, a V-phase current Ivr, and a W-phase current Iwr, are respectively detected by current sensors 43 and output to the control device 2.

A magnetic pole position θ of the rotor of the electric motor 4 at each time point is detected by a rotation sensor 44 and output to the control device 2. The rotation sensor 44 is formed by a resolver or the like. The magnetic pole position θ represents the rotational angle of the rotor in terms of electrical angle. The target torque TM of the electric motor 4 is input to the control device 2 as a signal representing a request from another control device or the like such as a vehicle control device (not shown).

1-2. Configuration of Control Device

The function of the control device 2 shown in FIG. 1 will be described below in detail with reference to FIGS. 2 to 5. Each functional section of the control device 2 described below is implemented by hardware, software (a program), or a combination of both that performs various processes on input data using a logic circuit such as a microcomputer as a core member. As described above, the control device 2 receives the target torque TM and the magnetic pole position θ as inputs. Thus, the control device 2 generates the switching control signals S3 to S8 for driving the electric motor 4 in accordance with the target torque TM, the magnetic pole position θ, and the rotational speed ω of the electric motor 4 derived from the magnetic pole position θ, and outputs the generated signals to drive the inverter 6. In this event, the control device 2 drives the inverter 6 while switching between the PWM control and maximum torque control and the rectangular-wave control and field weakening control. The control device 2 also receives the power source voltage Vb of the DC voltage 3 and the system voltage Vdc generated by the converter 5 as inputs. Thus, the control device 2 determines the system voltage command value Vdct, which is a command value of the system voltage Vdc, on the basis of the AC voltage command values Vd and Vq, which are determined on the basis of the target torque TM and the rotational speed ω, and the current system voltage Vdc. Then, the control device 2 generates the switching control signals S1 and S2 for generating the determined system voltage Vdc, and outputs the generated signals to drive the converter 5.

In the event of the DC/AC conversion performed by the inverter 6, the control device 2 switches between execution of the PWM control and execution of the rectangular-wave control. In the embodiment, the PWM control includes two types of control schemes, namely sinusoidal-wave PWM control and overmodulation PWM control. In the sinusoidal-wave PWM control, the switching elements E3 to E8 of the inverter 6 are controlled to turn on and off on the basis of a comparison between sinusoidal voltage command values Vu, Vv, and Vw and a carrier wave. Specifically, the duty ratio of each pulse is controlled such that the output voltage waveform of the inverter 6 for each of the U-, V-, and W-phases is formed by a collection of pulses forming high-level periods for which the upper arm elements E3, E5, and E7 are turned on and low-level periods for which the lower arm elements E4, E6, and E8 are turned on, and such that the fundamental-wave component of the output voltage waveform forms a sinusoidal wave in a certain period. When the ratio of the effective value of the fundamental-wave component of the output voltage waveform of the inverter 6 to the system voltage Vdc is defined as a modulation rate m (see Formula (7) to be discussed later), the modulation rate m can be varied in the range of 0 to 0.61 in the sinusoidal-wave PWM control. The sinusoidal-wave PWM control is PWM control in which the amplitude of the waveform of the voltage command values Vu, Vv, and Vw is equal to or less than the amplitude of the carrier waveform.

In the overmodulation PWM control, the duty ratio of each pulse is controlled so as to increase at upwardly convex portions of the fundamental-wave component and so as to reduce at downwardly convex portions of the fundamental-wave component compared to that in the sinusoidal-wave PWM control such that the waveform of the fundamental-wave component of the output voltage waveform of the inverter 6 is deformed to obtain an amplitude larger than that in the sinusoidal-wave PWM control. In the overmodulation PWM control, the modulation rate m can be varied in the range of 0.61 to 0.78. The overmodulation PWM control is PWM control in which the amplitude of the waveform of the voltage command values Vu, Vv, and Vw exceeds the amplitude of the carrier waveform. The rectangular-wave control is the overmodulation PWM control in which the modulation rate m is enhanced to a maximum of 0.78. In the rectangular-wave control, control is performed such that the output voltage waveform of the inverter 6 for each of the U-, V-, and W-phases is a rectangular wave in which one high-level period and one low-level period alternately appear per one cycle with the ratio between the high-level period and the low-level period being 1:1. Consequently, the inverter 6 outputs a rectangular voltage in the rectangular-wave control. The modulation rate m is fixed at 0.78 in the rectangular-wave control. In the rectangular-wave control, each of the switching elements E3 to E8 is turned on once and turned off once per one cycle in terms of electrical angle of the electric motor 4, and one pulse is output for each phase per half a cycle in terms of electrical angle. In any of the sinusoidal-wave PWM control, the overmodulation PWM control, and the rectangular-wave control, the output voltage waveforms for each phase are output with their phases shifted by 120° from each other.

As the rotational speed ω of the electric motor 4 becomes higher, the voltage induced by the electric motor 4 becomes higher, and hence the AC voltage required to drive the electric motor 4 (hereinafter referred to a "required voltage") also becomes higher. When the required voltage exceeds the maximum AC voltage that can be output from the inverter 6 (hereinafter referred to as a "maximum output voltage") through conversion of the system voltage Vdc at that time, it is not possible to provide the coils with required currents, and to control the electric motor 4 appropriately. Thus, in the embodiment, the modulation rate m in the PWM control (the sinusoidal-wave PWM control or the overmodulation PWM control) is varied in the range of 0 to 0.78 in accordance with the required voltage of the electric motor 4, and when the required voltage of the electric motor 4 is lower than the maximum output voltage in that range, maximum torque control is performed along with the PWM control. Then, when the required voltage of the electric motor 4 reaches the maximum output voltage at the maximum modulation rate (m=0.78) of the PWM control, field weakening control is performed along with the rectangular-wave control. The maximum torque control is control in which the current phase is adjusted such that the output torque of the electric motor 4 becomes maximum for the same current. Meanwhile, the field weakening control is control in which the current phase is adjusted (advanced compared to that in the maximum torque control) such that the coils produce a magnetic flux in the direction in which the field magnetic flux of the electric motor 4 is weakened. The required voltage and the maximum output voltage are each an effective value of an AC voltage and thus can be compared with each other.

Figure 3:
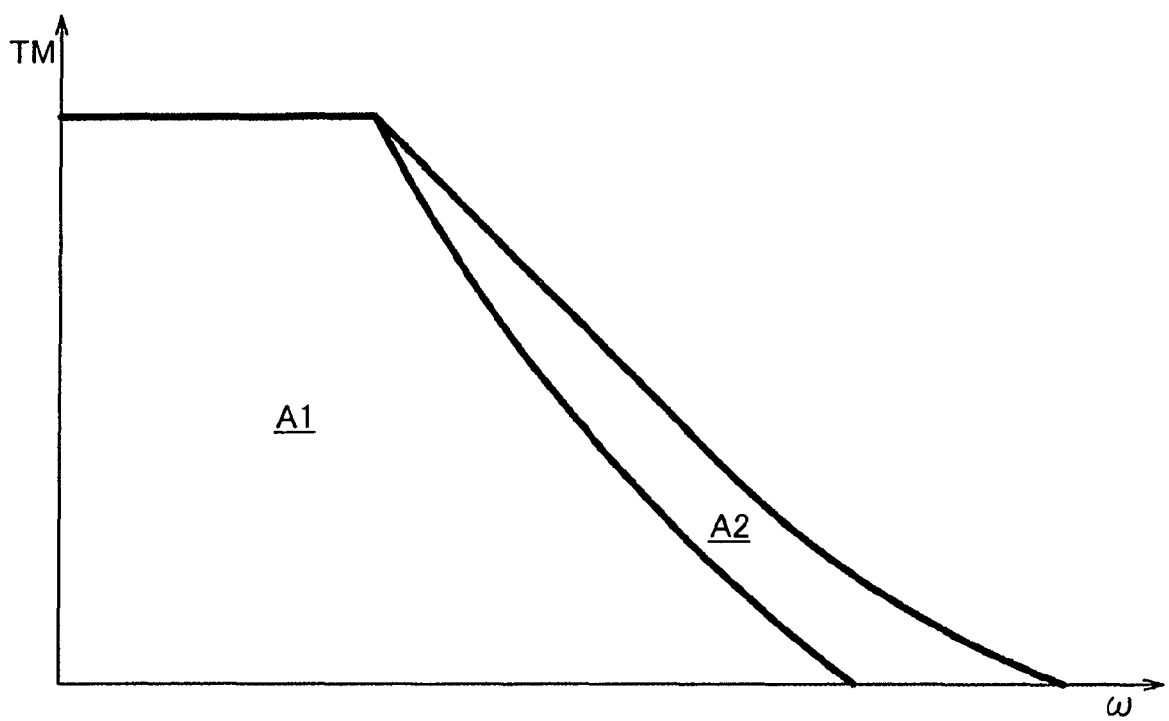
FIG. 3 shows the operable regions of an electric motor defined by the rotational speed and the torque according to the first embodiment of the present invention.
Figure 4:
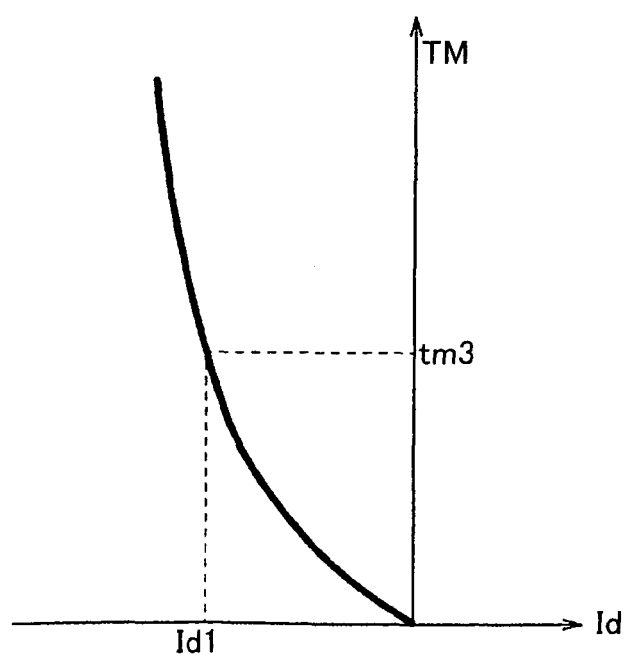
FIG. 4 is an exemplary fundamental d-axis current command value table according to the first embodiment of the present invention.

FIG. 3 shows a region A1 in which the PWM control and the maximum torque control are executed and a region A2 in which the rectangular-wave control and the field weakening control are executed, which form operable regions of the electric motor 4 defined by the rotational speed ω and the target torque TM. In FIG. 3, a boost in the system voltage Vdc is not considered. As described above, as the rotational speed ω of the electric motor 4 becomes higher, the induced voltage becomes higher, and hence the required voltage of the electric motor 4 also becomes higher. Thus, when an operating point determined by the target torque TM input to the control device 2 and the rotational speed ω of the electric motor 4 at that time falls within the region A1 in which the rotational speed is relatively low, the PWM control and the maximum torque control are executed. Meanwhile, when the operating point falls within the region A2 in which the rotational speed is relatively high, the rectangular-wave control and the field weakening control are executed. The boundary between the region A1 and the region A2 is determined by the rotational speed ω and the torque at which the required voltage of the electric motor 4 during the maximum torque control matches the maximum output voltage at the maximum modulation rate (that is, at a modulation rate of m=0.78, at which the rectangular-wave control is started) of the PWM control.

As shown in FIG. 2, a d-axis current command value derivation section 21 receives the target torque TM as an input. The d-axis current command value derivation section 21 derives a fundamental d-axis current command value Idb on the basis of the input target torque TM. The fundamental d-axis current command value Idb is equivalent to a command value of the d-axis current in the maximum torque control. In the embodiment, the d-axis current command value derivation section 21 derives the fundamental d-axis current command value Idb matching the value of the target torque TM using a fundamental d-axis current command value table shown in FIG. 4. In the illustrated example, a value of "tm3" is input as the target torque TM, and accordingly the d-axis current command value derivation section 21 derives "Id1" as the fundamental d-axis current command value Idb. The thus derived fundamental d-axis current command value Idb is input to a first subtractor 23. The first subtractor 23 further receives a field weakening current command value ΔId, which is derived by a first integrator 31 to be discussed later, as an input. The first subtractor 23 subtracts the field weakening current command value ΔId from the fundamental d-axis current command value Idb to derive a final d-axis current command value Id as indicated by Formula (1) below:

$$Id = Idb - \Delta Id \quad (1)$$

Figure 5:
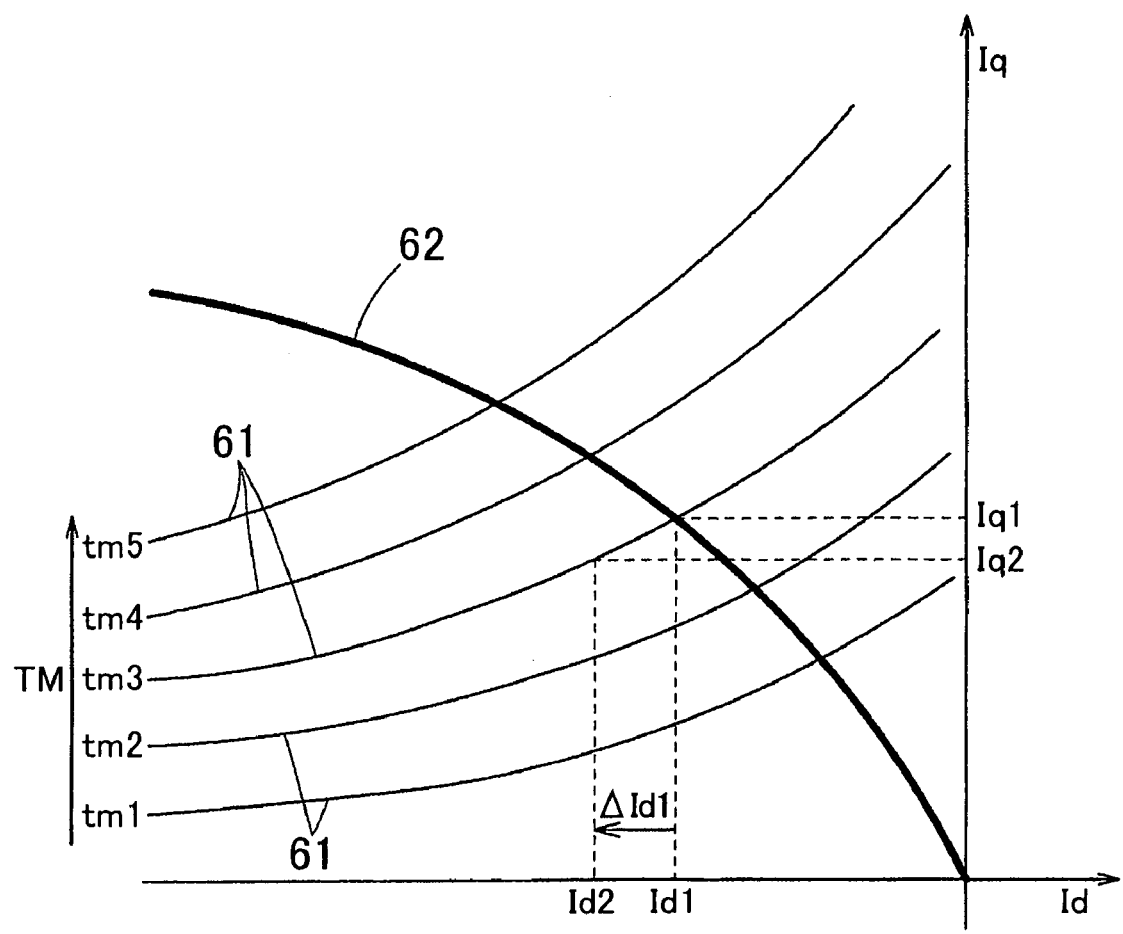
FIG. 5 is an exemplary q-axis current command value table according to the first embodiment of the present invention.

A q-axis current command value derivation section 22 receives the target torque TM and the field weakening current command value ΔId as inputs. The q-axis current command value derivation section 22 derives a q-axis current command value Iq on the basis of the input target torque TM and field weakening current command value ΔId. In the embodiment, the q-axis current command value derivation section 22 derives the q-axis current command value Iq matching the values of the target torque TM and the field weakening current command value ΔId using a q-axis current command value table shown in FIG. 5. In FIG. 5, the thin lines are equal torque curves 61 that indicate values of the d-axis current and the q-axis current for outputting each of torques tm1 to tm5, and the thick line is a maximum torque control curve 62 that indicates values of the d-axis current and the q-axis current for performing the maximum torque control. In the illustrated example, the value of "tm3" is input as the target torque TM, and "ΔId1" is input as the field weakening current command value ΔId. Accordingly, the q-axis current command value derivation section 22 first derives a q-axis current value "Iq1" at the intersection between the equal torque curve 61 for the target torque TM=tm3 as a fundamental q-axis current command value. The fundamental q-axis current command value is equivalent to a command value of the q-axis current in the maximum torque control. Hence, when the field weakening current command value ΔId is zero (ΔId=0), the fundamental q-axis current command value is used as the final q-axis current command value Iq. In the example, "ΔId1" is input as the field weakening current command value ΔId, and therefore a q-axis current value "Iq2" at a point shifted from the above intersection by ΔId1 along the equal torque curve 61 for the target torque TM=tm3 in the negative direction of the d-axis is derived as the q-axis current command value Iq. The d-axis current value (Id1) corresponding to the fundamental q-axis current command value (Iq1) obtained using the q-axis current command value table of FIG. 5 matches the value of the fundamental d-axis current command value Idb obtained using the fundamental d-axis current command value table shown in FIG. 4, and a d-axis current value (Id2) obtained by subtracting the field weakening current command value ΔId (=ΔId1) from the above d-axis current value (Id1) matches the final d-axis current command value Id (=Idb−ΔId) derived by the first subtractor 23. Hence, the d-axis current command value Id can also be calculated using the table shown in FIG. 5.

A current control section 24 receives the d-axis current command value Id and the q-axis current command value Iq derived as described above. The current control section 24 further receives an actual d-axis current Idr and an actual q-axis current Iqr from a three-phase/two-phase conversion section 27 as inputs, and receives the rotational speed ω of the electric motor 4 from a rotational speed derivation section 28 as an input. The actual d-axis current Idr and the actual q-axis current Iqr are derived through three-phase/two-phase conversion performed by the three-phase/two-phase conversion section 27 on the basis of the U-phase current Iur, the V-phase current Ivr, and the W-phase current Iwr detected by the current sensor 43 (see FIG. 1) and the magnetic pole position θ detected by the rotation sensor 44 (see FIG. 1). The rotational speed ω of the electric motor 4 is derived by the rotational speed derivation section 28 on the basis of the magnetic pole position θ detected by the rotation sensor 44 (see FIG. 1).

The current control section 24 derives a d-axis current deviation δId, which is the deviation between the d-axis current command value Id and the actual d-axis current Idr, and a q-axis current deviation δIq, which is the deviation between the q-axis current command value Iq and the actual q-axis current Iqr. The current control section 24 then performs proportional-integral control computation (PI control computation) on the basis of the d-axis current deviation δId to derive a d-axis voltage drop Vzd which is a d-axis component of voltage drop, and performs proportional-integral control computation on the basis of the q-axis current deviation δIq to derive a q-axis voltage drop Vzq which is a q-axis component of voltage drop.

The current control section 24 then subtracts a q-axis armature reaction Eq from the d-axis voltage drop Vzd to derive a d-axis voltage command value Vd as indicated by Formula (2) below:

$$Vd = Vzd - Eq \quad (2)$$
$$= Vzd - \omega \cdot Lq \cdot Iqr$$

As indicated by Formula (2), the q-axis armature reaction Eq is derived on the basis of the rotational speed ω of the electric motor 4, the actual q-axis current Iqr, and a q-axis inductance Lq.

The current control section 24 further adds a d-axis armature reaction Ed and an induced voltage Em due to armature flux linkage of a permanent magnet to the q-axis voltage drop Vzq to derive a q-axis voltage command value Vq as indicated by Formula (3) below:

$$Vq = Vzq + Ed + Em \quad (3)$$
$$= Vzq + \omega \cdot Ld \cdot Idr + \omega \cdot Mif$$

As indicated by Formula (3), the d-axis armature reaction Ed is derived on the basis of the rotational speed ω of the electric motor 4, the actual d-axis current Idr, and a d-axis inductance Ld. Also, the induced voltage Em is derived on the basis of an induced voltage constant MIf, which is determined in accordance with the effective value of the armature flux linkage of the permanent magnet, and the rotational speed ω of the electric motor 4.

In the embodiment, the d-axis voltage command value Vd and the q-axis voltage command value Vq are used as AC voltage command values which are command values of the AC voltage supplied from the inverter 6 to the electric motor 4. Thus, the d-axis current command value derivation section 21, the q-axis current command value derivation section 22, and the current control section 24 form an AC voltage command determination section 7 that determines the AC voltage command values Vd and Vq on the basis of the target torque TM and the rotational speed ω of the electric motor 4.

A two-phase/three-phase conversion section 25 receives the d-axis voltage command value Vd and the q-axis voltage command value Vq as inputs. The two-phase/three-phase conversion section 25 also receives the magnetic pole position A detected by the rotation sensor 44 (see FIG. 1) as an input. The two-phase/three-phase conversion section 25 performs two-phase/three-phase conversion using the magnetic pole position θ to derive a U-phase voltage command value Vu, a V-phase voltage command value Vv, and a W-phase voltage command value Vw from the d-axis voltage command value Vd and the q-axis voltage command value Vq.

A PWM pulse generation section 26 receives the U-phase voltage command value Vu, the V-phase voltage command value Vv, and the W-phase voltage command value Vw as inputs. The PWM pulse generation section 26 generates the switching control signals S3 to S8 for controlling each of the switching elements E3 to E8 of the inverter 6 shown in FIG. 1 on the basis of a comparison between the sinusoidal voltage command values Vu, Vv, and Vw for each phase and the carrier wave. Then, each of the switching elements E3 to E8 of the inverter 6 operates to turn on and off in accordance with the switching control signals S3 to S8 to perform the PWM control (the sinusoidal-wave PWM control or the overmodulation PWM control) or the rectangular-wave control. In the embodiment, the amplitude of the carrier wave is fixed at the same value as the amplitude of the voltage command values Vu, Vv, and Vw for each phase which is equivalent to the upper limit of the modulation rate m (=0.61) in the sinusoidal-wave PWM control. Consequently, in the case where the input voltage command values Vu, Vv, and Vw for each phase have an amplitude equivalent to the modulation rate m (=0.61 to 0.78) exceeding the upper limit of the modulation rate m (=0/61) in the sinusoidal-wave PWM control, the PWM pulse generation section 26 generates the switching control signals S3 to S8 for executing the overmodulation PWM control in which the output voltage waveform of the inverter 6 basically forms PWM pulses and is continuously at a high level or a low level at portions where the voltage command values Vu, Vv, and Vw exceed the amplitude of the carrier wave. Further, in the case where the input voltage command values Vu, Vv, and Vw for each phase have an amplitude equivalent to the upper limit of the modulation rate m (=0.78) in the overmodulation PWM control, the PWM pulse generation section 26 generates the switching control signals S3 to S8 for executing the rectangular-wave control in which the output voltage waveform of the inverter 6 is a rectangular wave in which one high-level period and one low-level period alternately appear per one cycle.

A voltage command value conversion value derivation section 29 receives the d-axis voltage command value Vd and the q-axis voltage command value Vq as inputs. The voltage command conversion value derivation section 29 derives a voltage command conversion value Va on the basis of the d-axis voltage command value Vd and the q-axis voltage command value Vq in accordance with Formula (4) below:

$$Va=\sqrt{(Vd^2+Vq^2)}/0.78 \quad (4)$$

In the formula, √(Vd²+Vq²) is equivalent to the effective value of the three-phase line voltage. Thus, in the embodiment, the voltage command conversion value Va is derived as a value obtained by dividing the effective value of the three-phase line voltage by a theoretical maximum modulation rate (m=0.78). The voltage command conversion value Va is a conversion value that allows comparison of the AC voltage command values Vd and Vq with the system voltage Vdc, and represents a DC voltage (the system voltage Vdc) required to output the AC voltage command values Vd and Vq. More particularly, the voltage command conversion value Va represents the system voltage Vdc which is required by the inverter 6 as an input to output an AC voltage in accordance with the AC voltage command values Vd and Vq.

A second subtractor 30 receives the voltage command conversion value Va and the value of the system voltage Vdc detected by the system voltage sensor 42 as inputs. The second subtractor 30 subtracts the value of the system voltage Vdc from the voltage command conversion value Va to derive a voltage deviation ΔV as indicated by Formula (5) below:

$$\Delta V = Va - Vdc \qquad (5)$$

In the embodiment, the voltage deviation ΔV is equivalent to the voltage index representing the magnitude of the AC voltage command values Vd and Vq with respect to the system voltage Vdc. Hence, in the embodiment, the voltage command conversion value derivation section 29 and the second subtractor 30 form a voltage index derivation section 11. The voltage deviation ΔV represents the degree to which the AC voltage command values Vd and Vq exceed the maximum value of the AC voltage that can be output in accordance with the system voltage Vdc at that time. Thus, the voltage deviation ΔV substantially functions as an insufficient voltage index representing the degree to which the system voltage Vdc is insufficient.

In the embodiment, a process switching section 10 receives the voltage deviation ΔV, the field weakening current command value ΔId, and the system voltage command value Vdct as inputs. On the basis of these values, the process switching section 10 switches between execution of a system voltage determination process, in which a system voltage command determination section 9 determines the system voltage command value Vdct, and execution of a field weakening command value determination process, in which a field weakening command value determination section 8 determines the field weakening current command value ΔId. In the embodiment, the process switching section 10 switches among a first state M1 in which the field weakening command value determination process is executed, a second state M2 in which the system voltage determination process is executed, and a third state M3 in which neither of the processes is executed. The process switching section 10 then inputs the voltage deviation ΔV to the first integrator 31 in the first state M1, to a second integrator 32 in the second state M2, and to neither of the first integrator 31 and the second integrator 32 in the third state M3. The process switching section 10 switches among the three states M1, M2, and M3 on the basis of the results of comparisons of the voltage deviation ΔV, the field weakening current command value ΔId, and the system voltage command value Vdct with respective thresholds prescribed in advance. The switching operation performed by the process switching section 10 is not described in detail here but will be described in detail later with reference to FIGS. 6 to 8.

When the process switching section 10 is in the first state M1, the first integrator 31 receives the voltage deviation ΔV as an input. The first integrator 31 integrates the voltage deviation ΔV using a predetermined gain to derive the field weakening current command value ΔId. The first integrator 31 has a self-holding function implemented by a self-holding circuit or the like. When the process switching section 10 is shifted to the second state M2, the first integrator 31 holds the final field weakening current command value ΔId that was output when the process switching section 10 was in the first state M1 to keep outputting the held value. When the process switching section 10 is shifted to the third state M3, the first integrator 31 cancels the self-holding function. In the embodiment, the field weakening current command value ΔId is equivalent to the field weakening command value representing the degree of field weakening in the field weakening control in which the field magnetic flux of the electric motor 4 is weakened. The voltage command conversion value derivation section 29, the second subtractor 30, and the first integrator 31 determine the field weakening current command value ΔId on the basis of the AC voltage command values Vd and Vq and the system voltage Vdc. Hence, in the embodiment, the voltage command conversion value derivation section 29, the second subtractor 30, and the first integrator 31 form the field weakening command value determination section 8. In the embodiment, as described above, the field weakening control is performed along with the rectangular-wave control, and the maximum torque control is performed along with the PWM control. Thus, the control device 2 is configured to cause the inverter 6 to perform the PWM control in the state where the field weakening current command value ΔId is zero, and to cause the inverter 6 to perform the rectangular-wave control in the state where the field weakening current command value ΔId is a value other than zero. The field weakening control is field control in which the fundamental d-axis current command value Idb is adjusted so as to weaken the field magnetic flux of the electric motor 4 compared to that in the maximum torque control. That is, the field weakening control is control in which the current phase is adjusted such that the armature coils produce a magnetic flux in the direction in which the field magnetic flux of the electric motor 4 is weakened. In the field weakening control, a d-axis current adjustment command value ΔId is set so as to advance the current phase compared to that in normal field control. Specifically, in the field weakening control, the d-axis current adjustment command value ΔId is set so as to vary the fundamental d-axis current command value Idb in the negative direction (to reduce the fundamental d-axis current command value Idb).

When the process switching section 10 is in the second state M2, the second integrator 32 receives the voltage deviation ΔV as an input. The second integrator 32 integrates the voltage deviation ΔV using a predetermined gain to derive the voltage boost command value ΔVb. The second integrator 32 has a self-holding function implemented by a self-holding circuit or the like. When the process switching section 10 is shifted to the first state M1, the second integrator 32 holds the final voltage boost command value ΔVb that was output when the process switching section 10 was in the second state M2 to keep outputting the held value. When the process switching section 10 is shifted to the third state M3, the second integrator 32 cancels the self-holding function. The voltage boost command value ΔVb is equivalent to a voltage value by which it is required to boost the power source voltage Vb in order to obtain the system voltage Vdc which is required by the inverter 6 as an input to output an AC voltage in accordance with the AC voltage command values Vd and Vq derived by the current control section 24.

An adder 33 receives the power source voltage Vb detected by the power source voltage sensor 41 and the voltage boost command value ΔVb. The adder 33 adds the voltage boost command value ΔVb to the power source voltage Vb to derive the system voltage command value Vdct as indicated by Formula (6) below:

$$Vdct = Vb + \Delta Vb \qquad (6)$$

The system voltage command value Vdct is used as a command value of the system voltage Vdc generated by the converter 5. As described above, the voltage command conversion value derivation section 29, the second subtractor 30, the second integrator 32, and the adder 33 determine the system voltage command value Vdct on the basis of the AC voltage command values Vd and Vq and the system voltage Vdc. Hence, in the embodiment, the voltage command conversion value derivation section 29, the second subtractor 30, the second integrator 32, and the adder 33 form the system voltage command determination section 9. As described above, the system voltage command determination section 9 determines the system voltage command value Vdct on the basis of the voltage deviation ΔV derived as the voltage index by the voltage command conversion value derivation section 29 and the second subtractor 30, more specifically on the basis of the voltage boost command value ΔVb, which is an integral value derived through integration of the voltage deviation ΔV performed by the second integrator 32, and the power source voltage Vb.

A voltage boost control section 34 receives the system voltage command value Vdct as an input. The voltage boost control section 34 generates the switching control signals S1 and S2 for controlling the voltage conversion switching elements E1 and E2 of the converter 5 in accordance with the system voltage command value Vdct. Then, the voltage conversion switching elements E1 and E2 of the converter 5 respectively operate to turn on and off in accordance with the switching control signals S1 and S2 to boost the power source voltage Vb. Specifically, the converter 5 boosts the power source voltage Vb by alternately switching between a state in which only the lower arm element E2 is turned on for a predetermined period and a state in which both the upper arm element E1 and the lower arm element E2 are turned off for a predetermined period in response to the switching control signals S1 and S2 from the control device 2. In this event, the voltage boost ratio matches the duty ratio of the on period of the lower arm element E2. That is, the system voltage Vdc output from the converter 5 can be increased by increasing the on-duty of the lower arm element E2 which increases the power accumulated in the reactor L1.

1-3. Operation of Process Switching Section

Figure 6:
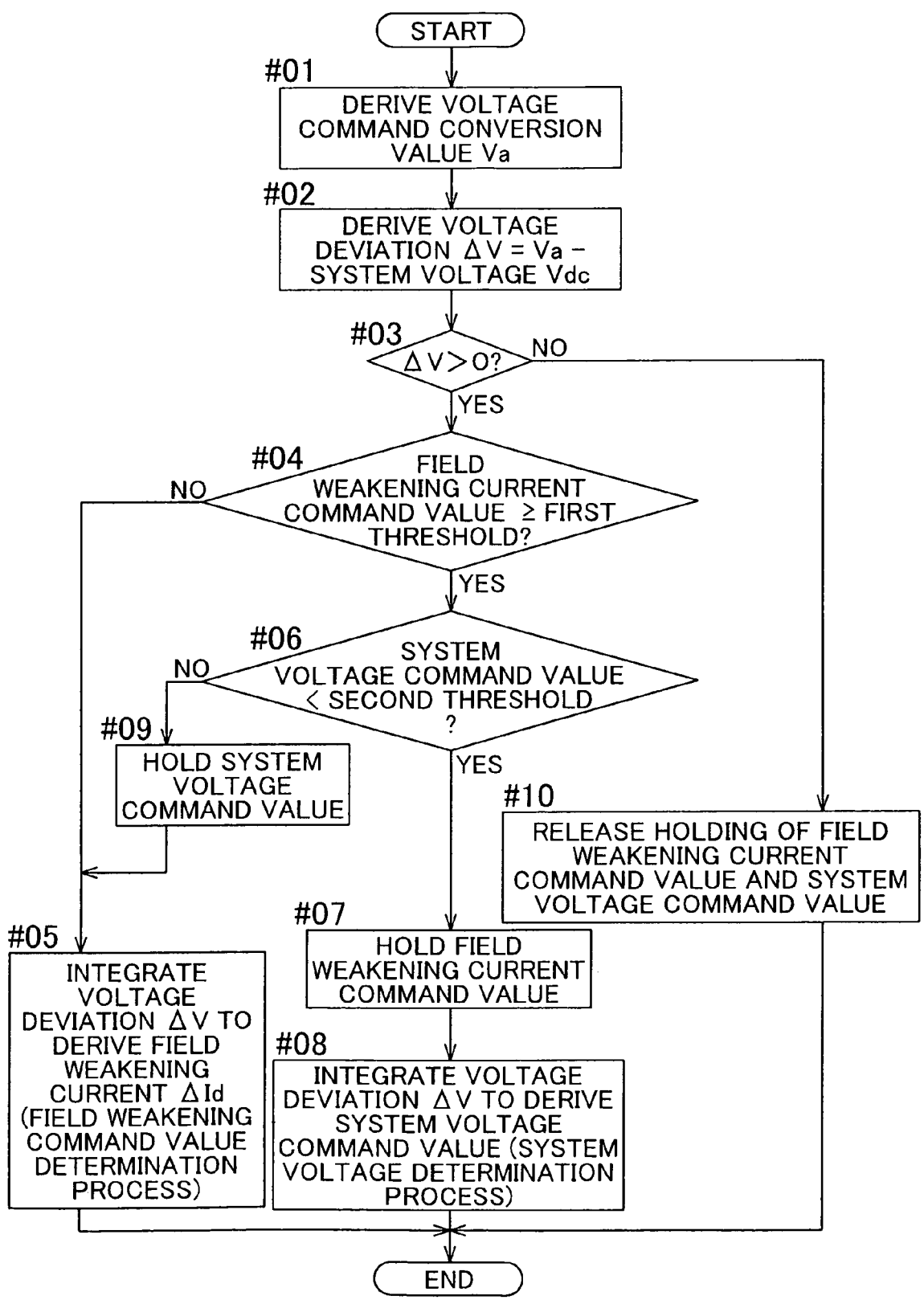
FIG. 6 is a flowchart showing the flow of operation of the control device according to the first embodiment of the present invention.

The switching operation of the process switching section 10 and associated operation of the respective sections of the control device 2 will be described below in detail with reference to FIGS. 6 to 8. FIG. 6 is a flowchart showing the flow of operation of the respective sections of the control device 2 associated with the switching operation performed by the process switching section 10.

As shown in FIG. 6, in the control device 2, the voltage command conversion value derivation section 29 first derives the voltage command conversion value Va (step #01). Next, the second subtractor 30 subtracts the value of the system voltage Vdc from the voltage command conversion value Va to derive the voltage deviation ΔV (=Va−Vdc) (step #02). Then, the process switching section 10 determines whether or not the voltage deviation ΔV derived in step #02 is more than zero (ΔV>0) (step #03). If the voltage deviation ΔV is more than zero (step #03: Yes), the system voltage Vdc is insufficient for the AC voltage command values Vd and Vq. Thus, the process switching section 10 next determines whether or not the field weakening current command value ΔId at that time is a predetermined first threshold ΔIds or more (ΔId≧ΔIds) (step #04). If the field weakening current command value ΔId is not the first threshold ΔIds or more (step #04: No), the process switching section 10 is shifted to the first state M1, in which the voltage deviation ΔV is input to the first integrator 31, for execution of the field weakening command value determination process. Consequently, the first integrator 31 integrates the voltage deviation ΔV to derive the field weakening current command value ΔId (step #05). In this case, the control device 2 causes the inverter 6 to perform the field weakening control and the rectangular-wave control, and does not cause the converter 5 to perform the voltage boost control but causes the converter 5 to output the power source voltage Vb as it is as the system voltage Vdc.

If the field weakening current command value ΔId is the first threshold ΔIds or more (step #04: Yes), the process switching section 10 next determines whether or not the system voltage command value Vdct is less than a second threshold Vdcmax (Vdct<Vdcmax) (step #06). If the system voltage command value Vdct is less than the second threshold Vdcmax (step #06: Yes), the first integrator 31 holds the field weakening current command value ΔId at that time (step #07). Then, the process switching section 10 is shifted to the second state M2, in which the voltage deviation ΔV is input to the second integrator 32, for execution of the system voltage determination process. Consequently, the second integrator 32 integrates the voltage deviation ΔV to derive the system voltage command value Vdct (step #08). In this case, the control device 2 causes the inverter 6 to perform the rectangular-wave control while performing the field weakening control in accordance with the constant field weakening current command value ΔId held in step #07, and causes the converter 5 to perform the voltage boost control in order to output the system voltage Vdc boosted with respect to the power source voltage Vb.

If the system voltage command value Vdct is not less than the second threshold Vdcmax (step #06: No), the second integrator 32 holds the voltage boost command value ΔVb at that time to hold the system voltage command value Vdct at that time (step #09). Then, the process switching section 10 is shifted to the first state M1, in which the voltage deviation ΔV is input to the first integrator 31, and the first integrator 31 integrates the voltage deviation ΔV to derive the field weakening current command value ΔId (step #05). In this case, the control device 2 causes the inverter 6 to perform the field weakening control and the rectangular-wave control while adjusting the field weakening current command value ΔId, and causes the converter 5 to perform the voltage boost control in accordance with the constant system voltage command value Vdct held in step #09 in order to output the system voltage boosted with respect to the power source voltage Vb.

Meanwhile, if the voltage deviation ΔV is not more than zero (step #03: No), the process switching section 10 is shifted to the third state M3, in which the voltage deviation ΔV is input to neither of the first integrator 31 and the second integrator 32. Hence, in the embodiment, the value of zero is used as the threshold determined in advance for the voltage deviation ΔV used as the voltage index. The threshold functions as a process execution threshold for determining whether or not to perform at least one of the field weakening command value determination process and the system voltage determination process. Then, if the field weakening current command value ΔId has been held since step #07 or the system voltage command value Vdct has been held since step #09, the held values are released (step #10). In the case where the field weakening control has been performed at this time, the first integrator 31 gradually reduces the field weakening current command value ΔId to eventually terminate the field weakening control. In the case where the voltage boost control has been performed at this time, the second integrator 32 gradually reduces the voltage boost command value ΔVb to eventually terminate the voltage boost control. On the other hand, in the case where none of the field weakening control and the voltage boost control has been performed at this time, that is, in the case where the inverter 6 has been caused to perform the maximum torque control and the PWM control and the converter 5 has not been caused to perform the voltage boost control but has been caused to output the power source voltage Vb as it is as the system voltage Vdc, the control device 2 maintains such a state.

As described above, the first threshold ΔIds is a threshold of the field weakening current command value ΔId for starting a voltage boost performed by the converter 5. When the rectangular-wave control is performed along with the field weakening control, the number of switching times of the switching elements E3 to E8 of the inverter 6 is significantly reduced compared to a case where the PWM control is performed. Thus, the switching loss can be reduced. On the other hand, when the field weakening current for performing the field weakening control is increased, the torque obtained for a current input to the electric motor 4 reduces to reduce the efficiency. Thus, the first threshold ΔIds is preferably set within a range in which the improvement in efficiency due to the reduction in switching loss achieved by performing the rectangular-wave control along with the field weakening control exceeds the reduction in efficiency due to the increase in field weakening current (increase in degree of field weakening). In this way, the efficiency of the electric motor drive device 1 can be enhanced. Meanwhile, the second threshold Vdcmax is preferably set to the upper limit of the system voltage command value Vdct that can be achieved by the converter 5. Consequently, the operable region of the electric motor 4 can be expanded by increasing the system voltage Vdc without increasing the field weakening current (see FIGS. 8A and 8B). After the system voltage command value Vdct reaches the second threshold Vdcmax which is the upper limit of the boosted voltage, the operable region of the electric motor 4 can be further expanded by increasing the field weakening current command value ΔId although the efficiency reduces.

Figure 7A:
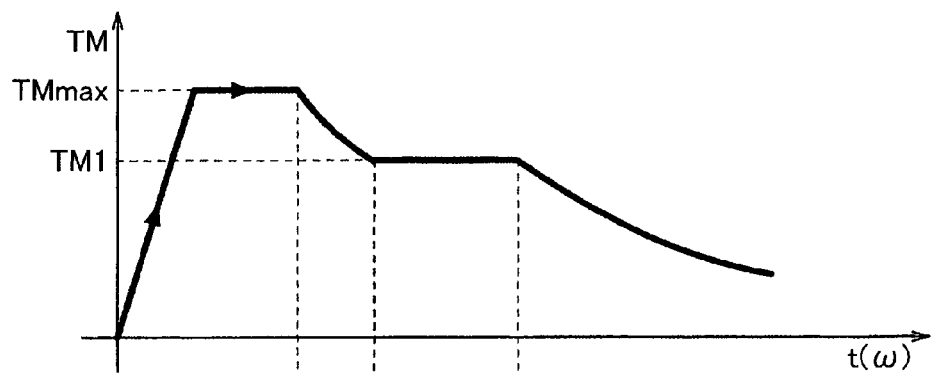
FIGS. 7A to 7B are timing charts, each showing a specific example of the operation of the control device according to the first embodiment of the present invention.
Figure 7B:
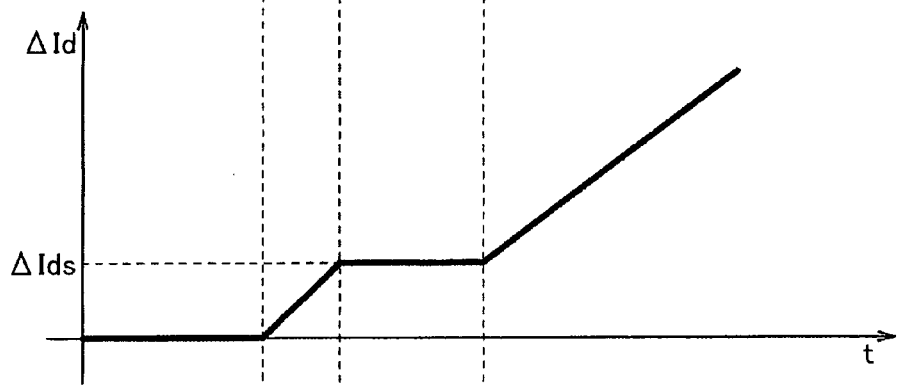
Figure 7C:
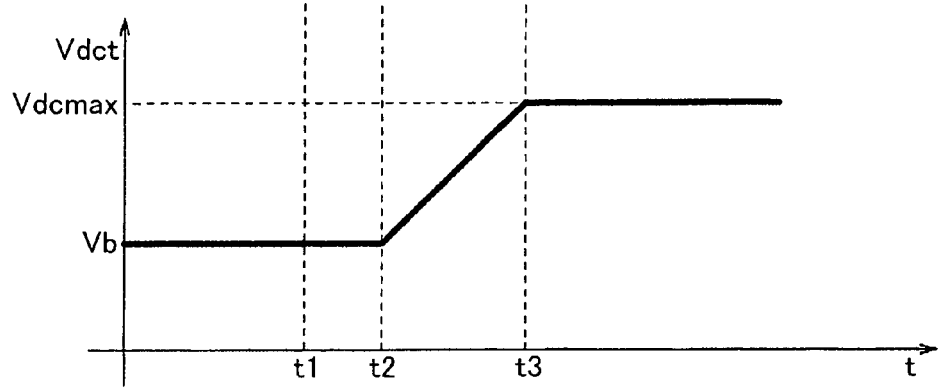
Figure 8A:
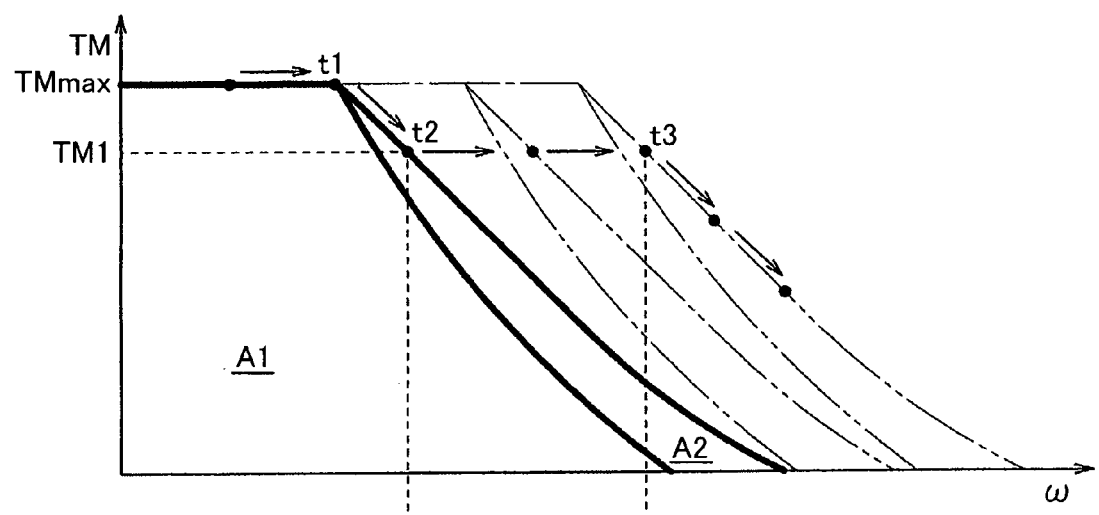
FIGS. 8A and 8B illustrate variations in system voltage command value in the control device and associated variations in operable regions of the electric motor according to the first embodiment of the present invention.
Figure 8B:
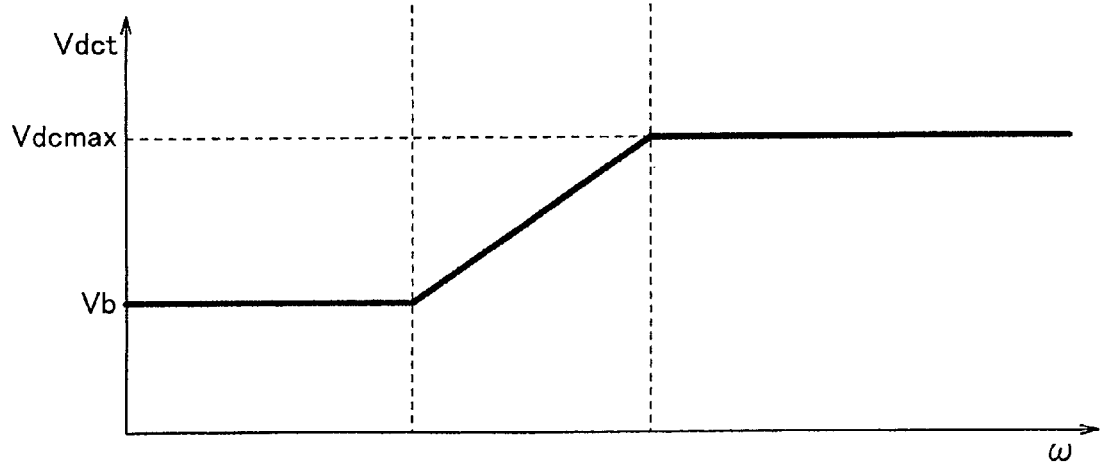

A specific example of operation of the control device 2 performed when the process switching section 10 performs the switching operation in accordance with the flowchart shown in FIG. 6 will be described below with reference to FIGS. 7A to 7C and 8A and 8B. FIG. 7A shows an example of how the target torque TM varies over time, FIG. 7B shows how the field weakening current command value ΔId varies over the same time, and FIG. 7C shows how the system voltage command value Vdct varies over the same time. In the example, as shown in FIG. 7A, the target torque TM first increases to the maximum torque TMmax that can be output by the electric motor 4, and thereafter basically changes along the maximum torque that can be output in accordance with the rotational speed ω of the electric motor 4 at respective time points. In the example, the rotational speed ω of the electric motor 4 is assumed to increase with a constant acceleration as the time elapses. FIG. 8B shows how the system voltage command value Vdct varies as the rotational speed ω increases along with the lapse of the time corresponding to FIG. 7C, and FIG. 8A shows how the operable regions of the electric motor 4 vary in accordance with the variations in the system voltage command value Vdct. In FIG. 8A, regions indicated by the solid lines indicate operable regions that are used when the power source voltage Vb is not boosted but used as it is as the system voltage Vdc, and regions indicated by the double-dashed lines indicate operable regions that vary as the power source voltage Vb is gradually boosted. A plurality of black dots in FIG. 8A indicate changes in the target torque TM at respective time points corresponding to those in FIG. 7A.

In the example, as shown in FIG. 8A, the operating point of the electric motor 4 defined by the target torque TM and the rotational speed ω is in the region A1, in which the maximum torque control and the PWM control can be executed without the need to boost the power source voltage Vb in order to output the AC voltage command values Vd and Vq required at the operating point, by time t1. In this case, the voltage deviation ΔV is not more than zero (step #03: No). Thus, as shown in FIGS. 7B and 7C, the field weakening current command value ΔId is zero and the system voltage command value Vdct is the same as the value of the power source voltage Vb (the voltage boost command value ΔVb is zero) by time t1.

Thereafter, in a period from time t1 to time t2, as shown in FIG. 8A, the operating point of the electric motor 4 is in the region A2, in which it is required to perform the field weakening control and the rectangular-wave control. In this case, the voltage deviation ΔV is more than zero (step #03: Yes). Thus, as shown in FIG. 7B, the process switching section 10 switches into execution of the field weakening command value determination process (step #05), and the control device 2 executes the field weakening control and the rectangular-wave control. Consequently, the field weakening current command value ΔId gradually increases from zero to the first threshold ΔIds as the rotational speed ω increases in the period from time t1 to time t2. In this event, if the field weakening current command value ΔId is less than the first threshold ΔIds (step #04: No), the control device 2 does not perform the voltage boost control, and the system voltage command value Vdct remains the same as the value of the power source voltage Vb. Thus, the torque that can be output by the electric motor 4 gradually reduces as the rotational speed ω increases. In the example, the field weakening current command value ΔId reaches the first threshold ΔIds at time t2 (step #04: Yes).

Thus, in a period from time t2 to time t3, as shown in FIGS. 7C and 8B, the process switching section 10 switches into execution of the system voltage determination process (step #08), and the control device 2 executes the voltage boost control. Consequently, the system voltage command value Vdct gradually increases from the same value as the power source voltage Vb to the second threshold Vdcmax, which is set as the upper limit of the system voltage command value Vdct, as the rotational speed ω increases in the period from time t2 to time t3. As the system voltage Vdc increases in this way, the operable region of the electric motor 4 gradually expands to the high rotational speed side as shown in FIG. 8A. In the example, the system voltage command value Vdct is increased as the rotational speed ω of the electric motor 4 increases, and thus the torque that can be output by the electric motor 4 is maintained to be constant during the increase in the rotational speed ω. The relationship between the rotational speed ω of the electric motor 4 and the torque that can be output by the electric motor 4 during the voltage boost control varies in accordance with the relationship between the voltage boost rate and the acceleration of the rotor of the electric motor 4. Then, during the voltage boost control, as shown in FIG. 7B, the process switching section 10 suspends the field weakening command value determination process to hold the field weakening current command value ΔId (=ΔIds) at a value at the start of the voltage boost control (step #07). Thus, the control device 2 executes the field weakening control and the rectangular-wave control also during the voltage boost control. In the example, the system voltage command value Vdct reaches the second threshold Vdcmax at time t3 (step #06: No).

Thus, after time t3, as shown in FIG. 7C, the process switching section 10 suspends the system voltage determination process to hold the system voltage command value Vdct at the second threshold Vdcmax which is the upper limit (step #09). Also, as shown in FIG. 7B, the process switching section 10 resumes the field weakening command value determination process (step #05). Consequently, the field weakening current command value ΔId gradually increases from the first threshold ΔIds as the rotational speed ω increases after time t3. Thus, the torque that can be output by the electric motor 4 gradually reduces as the rotational speed ω increases.

It is a matter of course that the control device 2 executes the field weakening control and the rectangular-wave control also during this time.

According to the embodiment, as has been described above, in the case where the AC voltage command values Vd and Vq exceed the maximum value of the AC voltage that can be output in accordance with the power source voltage Vb in the state where the rotational speed ω and the target torque TM of the electric motor 4 increase, the field weakening control and the rectangular-wave control are first performed (time t1 to time t2) before the voltage boost control is started. Thereafter, when the rotational speed ω and the target torque TM increase further, the system voltage Vdc is boosted with the field weakening control and the rectangular-wave control kept being performed. Thus, the effect of the rectangular-wave control to reduce the switching loss can be obtained over a wide operating range to enhance the efficiency of the electric motor drive device 1. Also, after the system voltage command value Vdct reaches the second threshold Vdcmax which is the upper limit, the rotational speed ω of the electric motor 4 can be further increased by increasing the field weakening current command value ΔId.

2. Second Embodiment

Figure 9:
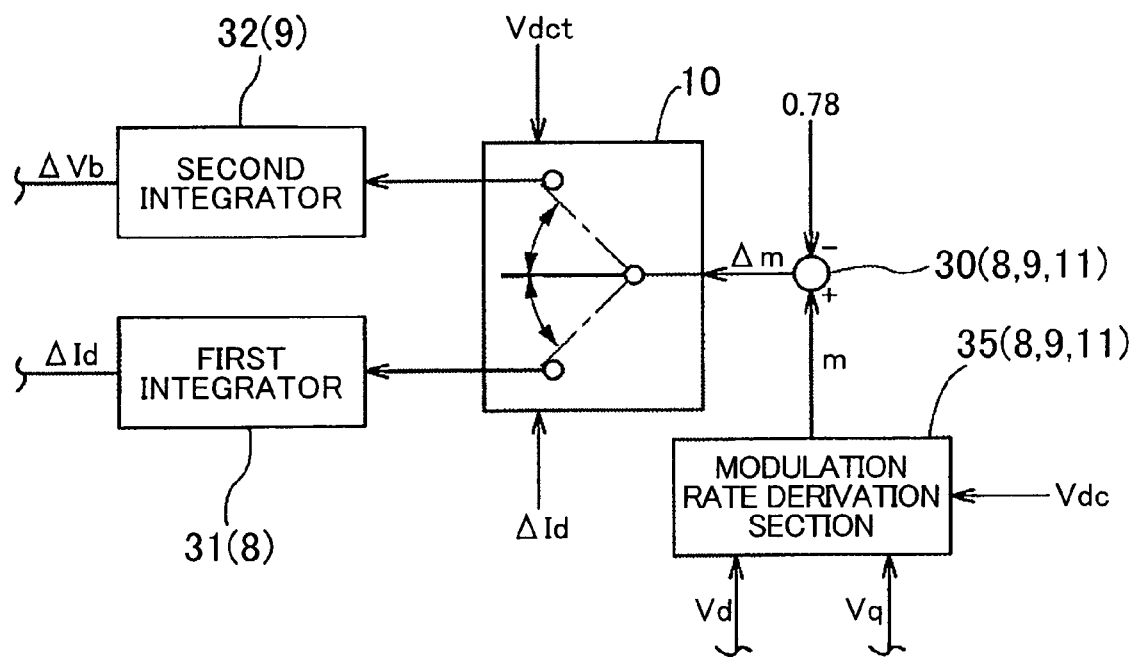
FIG. 9 is a functional block diagram of a control device according to a second embodiment of the present invention.

A second embodiment of the present invention will be described below with reference to FIGS. 9 and 10. FIG. 9 is a functional block diagram of the control device 2, which corresponds to FIG. 2 according to the above first embodiment and which shows only portions of the embodiment that are different from the above first embodiment. As shown in the drawing, the control device 2 according to the embodiment is different from that according to the first embodiment in the structure in which a modulation rate derivation section 35 is provided in place of the voltage command conversion value derivation section 29 and the field weakening current command value ΔId and the voltage boost command value ΔVb are determined on the basis of the modulation rate m derived by the modulation rate derivation section 35. The differences between the control device 2 according to the embodiment and that according to the above first embodiment will be mainly described below. The same elements as those in the above first embodiment will not be specifically described.

The modulation rate derivation section 35 receives the d-axis voltage command value Vd and the q-axis voltage command value Vq derived by the current control section 24 as inputs. The modulation rate derivation section 35 also receives the system voltage Vdc detected by the system voltage sensor 42 as an input. The modulation rate derivation section 35 derives the modulation rate m on the basis of these values in accordance with Formula (7) below:

$$m = \sqrt{(Vd^2 + Vq^2)}/Vdc \qquad (7)$$

In the embodiment, the modulation rate m represents the ratio of the AC voltage command values Vd and Vq to the system voltage Vdc. More particularly, the modulation rate m is the ratio of the effective value of the fundamental-wave component of the output voltage waveform of the inverter 6 based on the AC voltage command values Vd and Vq to the system voltage Vdc, and is derived as a value obtained by dividing the effective value of the three-phase line voltage by the value of the system voltage Vdc. As described above, the maximum value of the modulation rate m is "0.78" which is equivalent to the modulation rate m during execution of the rectangular-wave control.

The second subtractor 30 receives the modulation rate m and a value of "0.78" which is the maximum value of the modulation rate m as inputs. In the embodiment, the value of "0.78" is used as the predetermined target modulation rate. The second subtractor 30 subtracts the value of "0.78" from the modulation rate m to derive a modulation rate deviation Δm as indicated by Formula (8) below:

$$\Delta m = m - 0.78 \qquad (8)$$

In the embodiment, the modulation rate deviation Δm is equivalent to the voltage index representing the magnitude of the AC voltage command values Vd and Vq with respect to the system voltage Vdc. Hence, in the embodiment, the modulation rate derivation section 35 and the second subtractor 30 form the voltage index derivation section 11. As with the voltage deviation ΔV according to the above first embodiment, the modulation rate deviation Δm represents the degree to which the AC voltage command values Vd and Vq exceed the maximum value of the AC voltage that can be output in accordance with the system voltage Vdc at that time. Thus, the modulation rate deviation Δm substantially functions as an insufficient voltage index representing the degree to which the system voltage Vdc is insufficient.

In the embodiment, the process switching section 10 receives the modulation rate deviation Δm, the field weakening current command value ΔId, and the system voltage command value Vdct as inputs. On the basis of these values, the process switching section 10 switches between execution of the system voltage determination process, in which the system voltage command determination section 9 determines the system voltage command value Vdct, and execution of the field weakening command value determination process, in which the field weakening command value determination section 8 determines the field weakening current command value ΔId. In the embodiment, the process switching section 10 switches among the first state M1 in which the field weakening command value determination process is executed, the second state M2 in which the system voltage determination process is executed, and the third state M3 in which neither of the processes is executed. The process switching section 10 then inputs the modulation rate deviation Δm to the first integrator 31 in the first state M1, to the second integrator 32 in the second state M2, and to neither of the first integrator 31 and the second integrator 32 in the third state M3. The switching operation performed by the process switching section 10 will be described in detail later with reference to FIG. 10.

When the process switching section 10 is in the first state M1, the first integrator 31 receives the modulation rate deviation Δm as an input. The first integrator 31 integrates the modulation rate deviation Δm using a predetermined gain to derive the field weakening current command value ΔId. Hence, in the embodiment, the modulation rate derivation section 35, the second subtractor 30, and the first integrator 31 form the field weakening command value determination section 8. Meanwhile, when the process switching section 10 is in the second state M2, the second integrator 32 receives the modulation rate deviation Δm as an input. The second integrator 32 integrates the modulation rate deviation Δm using a predetermined gain to derive the voltage boost command value ΔVb. As in the above first embodiment, the adder 33 adds the thus derived voltage boost command value ΔVb to the power source voltage Vb to derive the system voltage command value Vdct. Hence, in the embodiment, the modulation rate derivation section 35, the second subtractor 30, the second integrator 32, and the adder 33 form the system voltage command determination section 9.

Operation of the respective sections of the control device 2 according to the embodiment associated with the switching operation of the process switching section 10 will be described below with reference to the flowchart shown in FIG. 10. The flowchart of FIG. 10 corresponds to the flowchart of FIG. 6 according to the above first embodiment.

Figure 10:
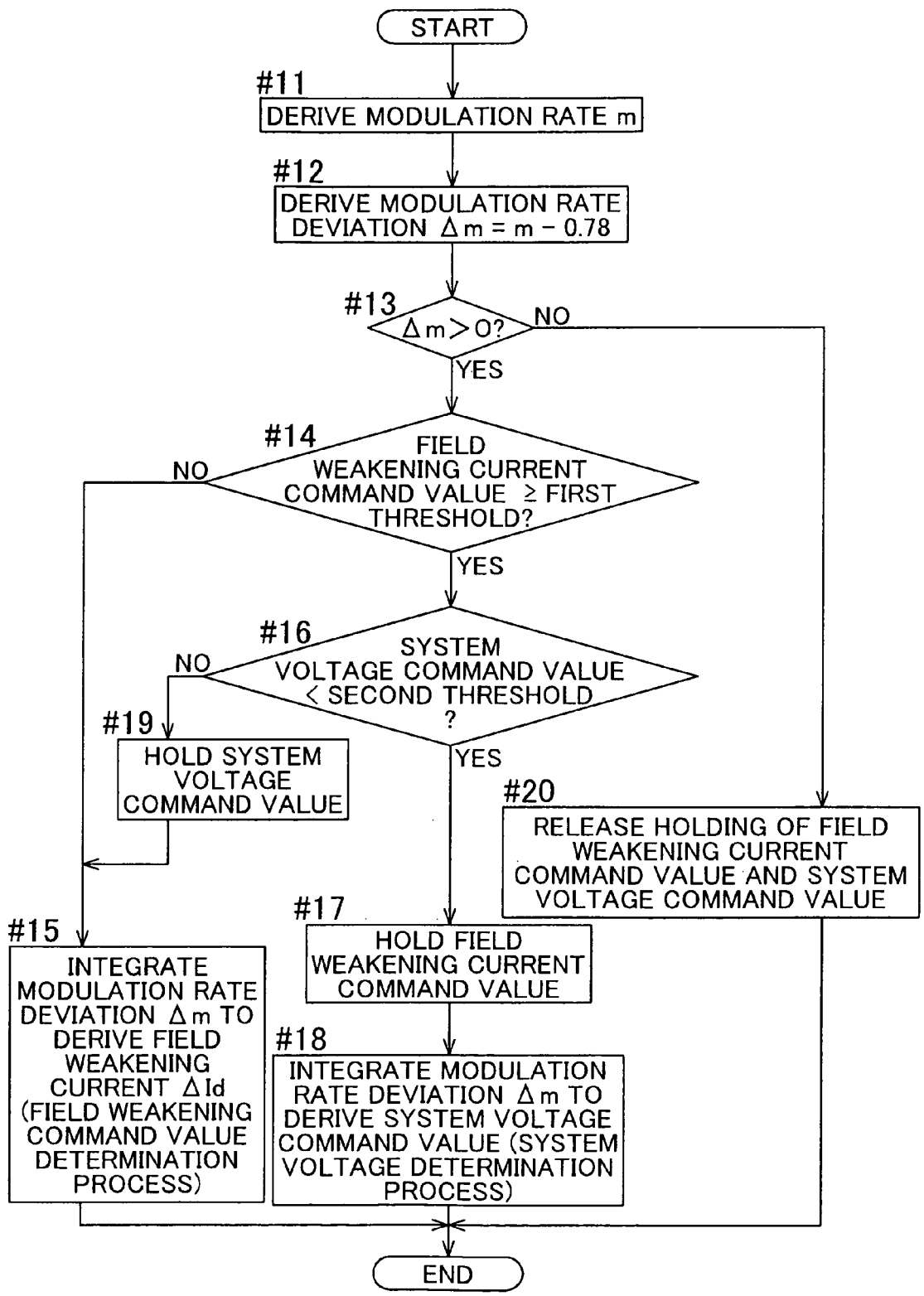
FIG. 10 is a flowchart showing the flow of operation of the control device according to the second embodiment of the present invention.

As shown in FIG. 10, in the control device 2, the modulation rate derivation section 35 first derives the modulation rate m (step #11). Next, the second subtractor 30 subtracts the value of "0.78", which is the maximum value of the modulation rate m, from the modulation rate m to derive the modulation rate deviation Δm (=m−0.78) (step #12). Then, the process switching section 10 determines whether or not the modulation rate deviation Δm derived in step #12 is more than zero (Δm>0) (step #13). If the modulation rate deviation Δm is more than zero (step #13: Yes), the system voltage Vdc is insufficient for the AC voltage command values Vd and Vq. Thus, the process switching section 10 next determines whether or not the field weakening current command value ΔId at that time is a predetermined first threshold ΔIds or more (ΔId≧ΔIds) (step #14). If the field weakening current command value ΔId is less than the first threshold ΔIds (step #14: No), the process switching section 10 is shifted to the first state M1, in which the modulation rate deviation Δm is input to the first integrator 31, for execution of the field weakening command value determination process. Consequently, the first integrator 31 integrates the modulation rate deviation Δm to derive the field weakening current command value ΔId (step #15). In this case, the control device 2 causes the inverter 6 to perform the field weakening control and the rectangular-wave control, and does not cause the converter 5 to perform the voltage boost control but causes the converter 5 to output the power source voltage Vb as it is as the system voltage Vdc.

If the field weakening current command value ΔId is the first threshold ΔIds or more (step #14: Yes), the process switching section 10 next determines whether or not the system voltage command value Vdct is less than a second threshold Vdcmax (Vdct<Vdcmax) (step #16). If the system voltage command value Vdct is less than the second threshold Vdcmax (step #16: Yes), the first integrator 31 holds the field weakening current command value ΔId at that time (step #17). Then, the process switching section 10 is shifted to the second state M2, in which the modulation rate deviation Δm is input to the second integrator 32, for execution of the system voltage determination process. Consequently, the second integrator 32 integrates the modulation rate deviation Δm to derive the system voltage command value Vdct (step #18). In this case, the control device 2 causes the inverter 6 to perform the rectangular-wave control while performing the field weakening control in accordance with the constant field weakening current command value ΔId held in step #17, and causes the converter 5 to perform the voltage boost control in order to output the system voltage Vdc boosted with respect to the power source voltage Vb.

If the system voltage command value Vdct is not less than the second threshold Vdcmax (step #16: No), the second integrator 32 holds the voltage boost command value ΔVb at that time to hold the system voltage command value Vdct at that time (step #19). Then, the process switching section 10 is shifted to the first state M1, in which the modulation rate deviation Δm is input to the first integrator 31, and the first integrator 31 integrates the modulation rate deviation Δm to derive the field weakening current command value ΔId (step #15). In this case, the control device 2 causes the inverter 6 to perform the field weakening control and the rectangular-wave control while adjusting the field weakening current command value ΔId, and causes the converter 5 to perform the voltage boost control in accordance with the constant system voltage command value Vdct held in step #19 in order to output the system voltage boosted with respect to the power source voltage Vb.

Meanwhile, if the modulation rate deviation Δm is not more than zero (step #13: No), the process switching section 10 is shifted to the third state M3, in which the modulation rate deviation Δm is input to neither of the first integrator 31 and the second integrator 32. Hence, in the embodiment, the value of zero is used as the threshold determined in advance for the modulation rate deviation Δm used as the voltage index. The threshold functions as a process execution threshold for determining whether or not to perform at least one of the field weakening command value determination process and the system voltage determination process. Then, if the field weakening current command value ΔId has been held since step #17 or the system voltage command value Vdct has been held since step #19, the held values are released (step #20). In the case where the field weakening control has been performed at this time, the first integrator 31 gradually reduces the field weakening current command value ΔId to eventually terminate the field weakening control. In the case where the voltage boost control has been performed at this time, the second integrator 32 gradually reduces the voltage boost command value ΔVb to eventually terminate the voltage boost control. On the other hand, in the case where none of the field weakening control and the voltage boost control has been performed at this time, that is, in the case where the inverter 6 has been caused to perform the maximum torque control and the PWM control and the converter 5 has not been caused to perform the voltage boost control but has been caused to output the power source voltage Vb as it is as the system voltage Vdc, the control device 2 maintains such a state.

3. Other Embodiments (1) In the above first embodiment, the voltage deviation ΔV is derived on the basis of Formulas (4) and (5). However, the present invention is not limited to such an embodiment, and may be applied to an electric motor drive device 1 including a system voltage command determination section 9 that determines the system voltage command value Vdct on the basis of a comparison between the magnitude of the AC voltage command values Vd and Vq, which vary along with the effective value of the three-phase line voltage, and the system voltage Vdc. Thus, in one preferred embodiment of the present invention, the voltage index representing the magnitude of the AC voltage command values Vd and Vq with respect to the system voltage Vdc may be derived as described below, for example.

Figure 11:
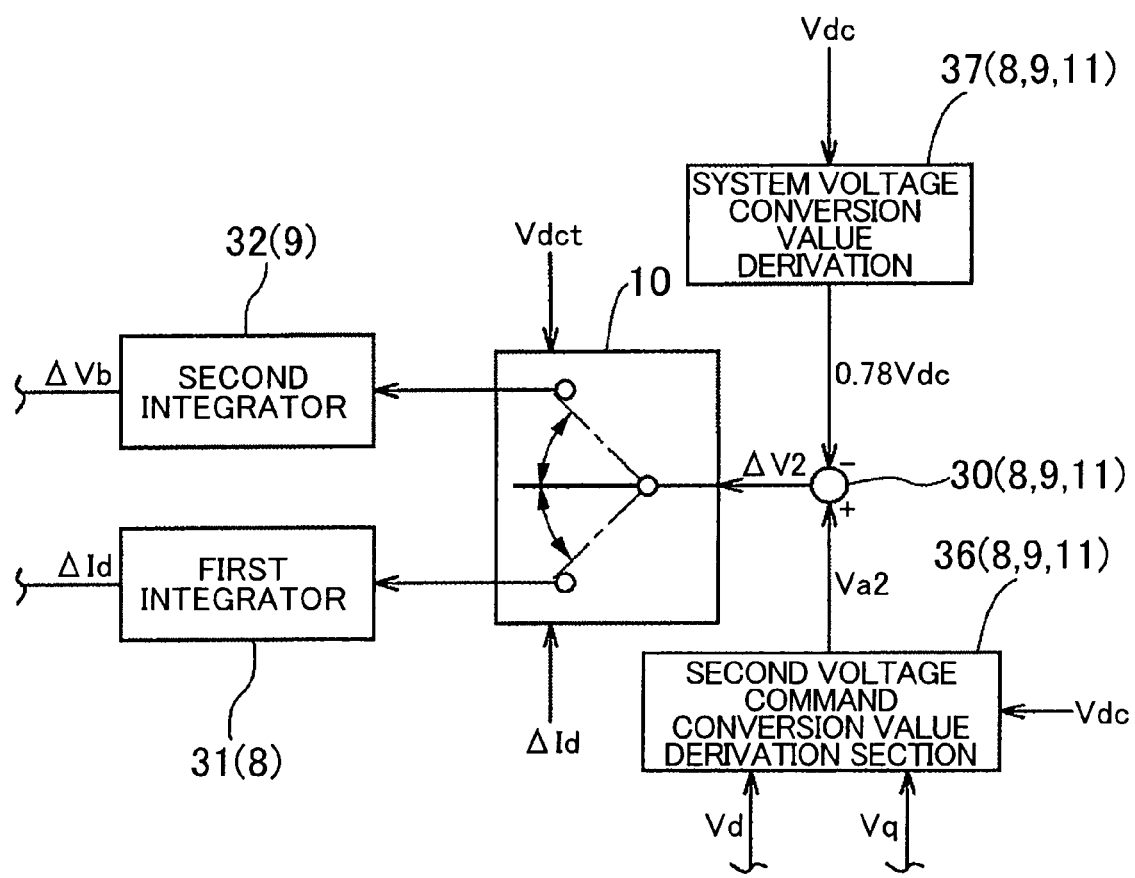
FIG. 11 is a functional block diagram of a control device according to another embodiment of the present invention.

That is, as shown in FIG. 11, the control device 2 includes a second voltage command conversion value derivation section 36 and a system voltage conversion value derivation section 37. The second voltage command conversion value derivation section 36 derives a second voltage command conversion value Va2 representing the magnitude of the AC voltage command values Vd and Vq in accordance with Formula (9) below. The second voltage command conversion value Va2 is equivalent to the effective value of the three-phase line voltage.

$$Va2=\sqrt{(Vd^2+Vq^2)} \tag{9}$$

The system voltage conversion value derivation section 37 derives a system voltage conversion value (=0.78 Vdc) representing the maximum value of the AC voltage that can be output in accordance with the system voltage Vdc. The system voltage conversion value is derived by multiplying the system voltage Vdc by a theoretical maximum modulation rate (m=0.78). The system voltage conversion value is a conversion value that allows comparison of the system voltage Vdc with the AC voltage command values Vd and Vq (in the embodiment, the second voltage command conversion value Va2).

Then, the second subtractor 30 subtracts the system voltage conversion value from the second voltage command conversion value Va2 to derive a second voltage deviation ΔV2 as indicated by Formula (10) below:

$$\Delta V2 = Va2 - 0.78 Vdc \qquad (10)$$
$$= \sqrt{(Vd^2 + Vq^2)} - 0.78 Vdc$$

Thus, the second voltage deviation ΔV2 is equivalent to the deviation between the AC voltage command values Vd and Vq and the maximum value of the AC voltage that can be output in accordance with the system voltage Vdc. In the example, the second voltage deviation ΔV2 is equivalent to the voltage index. Also in this case, the second voltage deviation ΔV2 represents the degree to which the AC voltage command values Vd and Vq exceed the maximum value of the AC voltage that can be output in accordance with the system voltage Vdc at that time, and substantially functions as an insufficient voltage index representing the degree to which the system voltage Vdc is insufficient.

(2) In the above embodiments, the electric motor drive device 1 includes the voltage boost converter 5 that boosts the power source voltage Vb to generate the system voltage Vdc as the voltage conversion section. However, the present invention is not limited to such embodiments, and may be applied to an electric motor drive device 1 including any type of voltage conversion section that converts the power source voltage Vb from the DC voltage 3 to generate the desired system voltage Vdc. Thus, in one preferred embodiment of the present invention, for example, the electric motor drive device 1 may include a voltage boost/reducing converter that both boosts and reduces the power source voltage Vb, or a voltage reducing converter that reduces the power source voltage Vb, as the voltage conversion section. Also in this case, the system voltage command value Vdct can be determined on the basis of the AC voltage command values Vd and Vq and the system voltage Vdc as in the above embodiments.

(3) In the above embodiments, the d-axis voltage command value Vd and the q-axis voltage command value Vq are used as the AC voltage command values. However, the present invention is not limited to such embodiments, and any other command value that represents the AC voltage required by the electric motor 4 and that can be compared with the system voltage Vdc may be used as the AC voltage command value to determine the system voltage command value Vdct. Thus, the U-phase voltage command value Vu, the V-phase voltage command value Vv, and the W-phase voltage command value Vw, for example, may be used as the AC voltage command values to determine the system voltage command value Vdct.

(4) In the above embodiments, the AC electric motor 4 is an interior permanent magnet synchronous motor (IPMSM) that operates on three-phase AC. However, the present invention is not limited to such embodiments, and the AC electric motor 4 may be a surface permanent magnet synchronous motor (SPMSM), for example, or may be an induction electric motor or the like, rather than a synchronous electric motor. The AC to be supplied to such an AC electric motor may be single-phase, two-phase, and other multi-phase AC with four or more phases, rather than three-phase AC.

(5) In the above embodiments, the electric motor 4 is used as a drive power source for an electric vehicle, a hybrid vehicle, or the like. However, application of the electric motor 4 according to the present invention is not limited thereto, and the present invention may be applied to an electric motor for any application.

The present invention can be suitably utilized for a control device that controls an electric motor drive device that drives an AC electric motor.

What is claimed is:

1. A control device for an electric motor drive device including a voltage conversion section that converts a power source voltage from a DC power source to generate a desired system voltage and a DC/AC conversion section that converts the system voltage into an AC voltage to supply the resulting AC voltage to an AC electric motor, the control device comprising:
an AC voltage command determination section that determines an AC voltage command value, which is a command value of the AC voltage supplied from the DC/AC conversion section to the AC electric motor, on the basis of a target torque of the AC electric motor and a rotational speed of the AC electric motor; and
a system voltage command determination section that determines a system voltage command value, which is a command value of the system voltage generated by the voltage conversion section, on the basis of the AC voltage command value and the system voltage.

2. The control device for an electric motor drive device according to claim 1, further comprising:
a voltage index derivation section that derives a voltage index representing a magnitude of the AC voltage command value with respect to the system voltage, wherein
the system voltage command determination section determines the system voltage command value on the basis of an integral value obtained by integrating the voltage index and the power source voltage.

3. The control device for an electric motor drive device according to claim 2, wherein
the voltage index is derived on the basis of a deviation between a voltage command conversion value, which represents a DC voltage required to output the AC voltage command value, and the system voltage.

4. The control device for an electric motor drive device according to claim 2, wherein
the voltage index is derived on the basis of a deviation between a modulation rate, which represents a ratio of the AC voltage command value to the system voltage, and a predetermined target modulation rate.

5. The control device for an electric motor drive device according to claim 2, wherein
the voltage index is derived on the basis of a deviation between the AC voltage command value and a maximum value of the AC voltage that can be output in accordance with the system voltage.

6. The control device for an electric motor drive device according to claim 2, further comprising:
a field weakening command value determination section that determines a field weakening current command value, which represents a degree of field weakening during field weakening control in which a field magnetic flux of the AC electric motor is weakened, on the basis of the AC voltage command value and the system voltage; and a process switching section that switches between execution of a system voltage determination process in which the system voltage command determination section determines the system voltage command value and execution of a field weakening command value determination process in which the field weakening command value determination section determines the field weakening current command value, wherein the process switching section switches between execution of the system voltage determination process and execution of the field weakening command value determination process on the basis of at least the field weakening command value and the system voltage command value.

7. The control device for an electric motor drive device according to claim 6, wherein the DC/AC conversion section is configured to perform pulse width modulation control when the field weakening command value is zero, and to perform rectangular-wave control in which a rectangular voltage is output when the field weakening command value is a value other than zero, and the process switching section executes the field weakening command value determination process when the AC voltage command value exceeds the maximum value of the AC voltage that can be output in accordance with the system voltage at that time until the field weakening command value reaches a predetermined first threshold, suspends the field weakening command value determination process when the field weakening command value reaches the predetermined first threshold to execute the system voltage determination process until the system voltage command value reaches a predetermined second threshold, and resumes the field weakening command value determination process when the system voltage command value reaches the predetermined second threshold.

8. The control device for an electric motor drive device according to claim 1, further comprising:

a field weakening command value determination section that determines a field weakening current command value, which represents a degree of field weakening during field weakening control in which a field magnetic flux of the AC electric motor is weakened, on the basis of the AC voltage command value and the system voltage; and a process switching section that switches between execution of a system voltage determination process in which the system voltage command determination section determines the system voltage command value and execution of a field weakening command value determination process in which the field weakening command value determination section determines the field weakening current command value, wherein the process switching section switches between execution of the system voltage determination process and execution of the field weakening command value determination process on the basis of at least the field weakening command value and the system voltage command value.

9. The control device for an electric motor drive device according to claim 8, wherein the DC/AC conversion section is configured to perform pulse width modulation control when the field weakening command value is zero, and to perform rectangular-wave control in which a rectangular voltage is output when the field weakening command value is a value other than zero, and the process switching section executes the field weakening command value determination process when the AC voltage command value exceeds the maximum value of the AC voltage that can be output in accordance with the system voltage at that time until the field weakening command value reaches a predetermined first threshold, suspends the field weakening command value determination process when the field weakening command value reaches the predetermined first threshold to execute the system voltage determination process until the system voltage command value reaches a predetermined second threshold, and resumes the field weakening command value determination process when the system voltage command value reaches the predetermined second threshold.

\* \* \* \* \*